United States Patent
Ramabhadran et al.

(10) Patent No.: US 7,009,849 B2
(45) Date of Patent: Mar. 7, 2006

(54) BUCK CONVERTER WITH MULTIPLE OUTPUTS AND METHOD OF OPERATION THEREOF

(75) Inventors: Ramanujam Ramabhadran, Waltham, MA (US); Karim N. Wassef, Murphy, TX (US)

(73) Assignee: Tyco Electronics Power Systems, Inc., Mesquite, TX (US)

( * ) Notice: Subject to any disclaimer, the term of this patent is extended or adjusted under 35 U.S.C. 154(b) by 0 days.

(21) Appl. No.: 10/695,593

(22) Filed: Oct. 28, 2003

(65) Prior Publication Data

US 2005/0088854 A1 Apr. 28, 2005

(51) Int. Cl.
*H02M 3/335* (2006.01)

(52) U.S. Cl. .............................. 363/16; 363/89; 363/40

(58) Field of Classification Search .................. 363/16, 363/21.02, 21.03, 123, 21.06, 40, 89
See application file for complete search history.

(56) References Cited

U.S. PATENT DOCUMENTS

| | | | | |
|---|---|---|---|---|
| 5,245,520 A | * | 9/1993 | Imbertson | 363/17 |
| 5,886,508 A | | 3/1999 | Jutras | |
| 5,991,167 A | * | 11/1999 | Van Lerberghe | 363/16 |
| 6,081,432 A | * | 6/2000 | Rinne et al. | 363/16 |
| 6,483,721 B1 | * | 11/2002 | Terashi | 363/17 |
| 6,570,268 B1 | | 5/2003 | Perry et al. | |

* cited by examiner

*Primary Examiner*—Shawn Riley

(57) ABSTRACT

A multiple output converter, and related method of operation thereof, that includes a primary output and at least one auxiliary output. In one embodiment, the multiple output converter includes a transformer having a primary winding and at least one secondary winding. The multiple output converter also includes a switch, coupled to the primary winding, that impresses an input voltage across the transformer. A first output voltage of the multiple output converter is produced at the primary output via a magnetizing inductance associated with the transformer. The multiple output converter still further includes an output inductor coupled to the at least one secondary winding. A second output voltage of the multiple output converter is produced at the auxiliary output via the output inductor.

20 Claims, 22 Drawing Sheets

BUCK CONVERTER WITH MULTIPLE OUTPUTS AND METHOD OF OPERATION THEREOF

TECHNICAL FIELD OF THE INVENTION

This invention relates to the field of power electronics and, more particularly, to a multiple output converter and method of operation thereof.

BACKGROUND OF THE INVENTION

A converter is a processing circuit that converts an input voltage or current source waveform into a specified output voltage or current waveform. A buck-derived switching converter (also referred to as a "buck converter") is a frequently employed converter that converts a direct current (DC) input waveform to a specified DC output waveform. A characteristic of buck converters, in general, is that the DC output waveform is less than the DC input waveform. A buck converter that does not employ a transformer as an isolation stage is referred to as a non-isolated buck converter. The non-isolated buck converter typically includes switching circuitry coupled to an input source of electrical power. The switching circuitry includes at least one active switch. The switching circuitry is coupled to an output inductor and output capacitor which provides the DC output waveform (i.e., an output voltage) at an output of the non-isolated buck converter.

Multiple output switching converters are often employed to provide multiple output voltage levels driving independent loads at varying current levels. In some cases, the output voltage levels may be reversed in polarity (e.g., +12 volts and −12 volts) and referenced to a common return. With regard to switching converters that include an isolation stage, the multiple output voltages may be provided via multiple windings on the secondary side of a transformer. In non-isolated switching converters (e.g., non-isolated buck converters), however, deriving multiple output voltages, irrespective of the level and polarity of the voltages, is more complex to implement and may impact the overall efficiency of the switching converters.

Presently, a second output voltage may be derived from a multiple output non-isolated buck converter via an inductor. Under such circumstances, the second output voltage is rectified through a rectifier (e.g., a diode rectifier or synchronous rectifier) and post regulated to deliver the second output voltage at an auxiliary output of the multiple output non-isolated buck converter. While employing yet another technique, a second output voltage may be derived from a multiple output non-isolated buck converter by employing a charge pump therein.

While the aforementioned techniques have proven beneficial, the approaches suffer from the foregoing limitations. The technique of using the inductor for the purpose of providing multiple output voltages in the multiple output non-isolated buck converter typically employs either a peak charge rectified or forward rectified outputs that may suffer from significant ripple currents associated with the primary and auxiliary outputs of the converter. Even for smaller currents, series damping is generally a prerequisite, along with a large inductor to account for the peak currents and ripple condition associated with the primary and auxiliary outputs of the converter. Thus, the design generally calls for larger magnetic components within the multiple output non-isolated buck converter. Charge pumps, on the other hand, have restrictions on current outputs relative to the respective footprints. Therefore, the present techniques and methods of generating the second output voltage still call for larger surface area magnetic devices.

Accordingly, what is needed in the art is a circuit and method that maintains regulation of the output voltages for a multiple output converter such as a multiple output non-isolated buck converter, while preserving the overall efficiency of the converter.

SUMMARY OF THE INVENTION

To address the above-discussed deficiencies of the prior art, the present invention provides a multiple output converter that includes a primary output and at least one auxiliary output. In one embodiment, the multiple output converter includes a transformer having a primary winding and at least one secondary winding. The multiple output converter also includes a switch, coupled to the primary winding, that impresses an input voltage across the transformer. A first output voltage of the multiple output converter is produced at the primary output via a magnetizing inductance associated with the transformer. The multiple output converter still further includes an output inductor coupled to the at least one secondary winding. A second output voltage of the multiple output converter is produced at the auxiliary output coupled via the output inductor.

In another aspect, the present invention provides a method of operating a multiple output converter including a primary output and at least one auxiliary output. In one embodiment, the method includes providing a transformer having a primary winding and at least one secondary winding. The method also includes impressing an input voltage across the transformer with a switch coupled to the primary winding. The method further includes producing a first output voltage at the primary output via a magnetizing inductance associated with the transformer. The method still further includes producing a second output voltage at the auxiliary output via an output inductor coupled to the at least one secondary winding.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
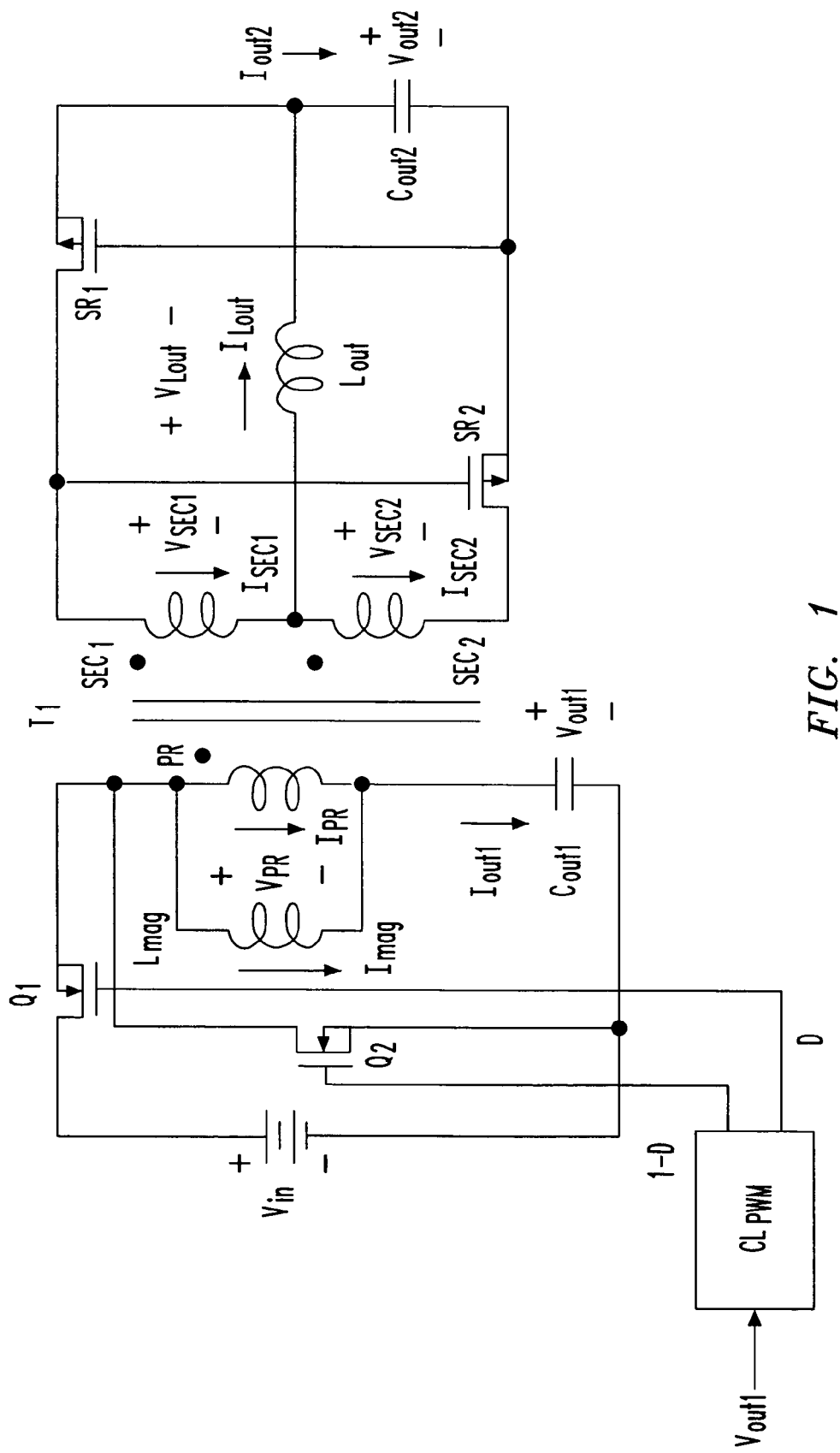
FIG. 1 illustrates a schematic diagram of an embodiment of a multiple output converter constructed according to the principles of the present invention.

Referring initially to FIG. 1, illustrated is a schematic diagram of an embodiment of a multiple output converter (e.g., multiple output buck converter) constructed according to the principles of the invention. The multiple output converter is coupled to a source of electrical power that provides an input voltage $V_{in}$ and includes first and second switches $Q_1$, $Q_2$ coupled to a primary winding PR of a transformer $T_1$. The transformer $T_1$ has a magnetizing inductance $L_{mag}$ and serves as an inductor associated with a primary output of the multiple output converter. The primary winding PR preferably has a gapped core to generate a requisite inductance value and a number of turns represented by $N_P$.

The transformer $T_1$ also includes first and second secondary windings $SEC_1$, $SEC_2$ coupled to a rectifier (e.g., a synchronous rectifier formed by first and second synchronous rectifier switches $SR_1$, $SR_2$) and having a number of turns represented by $N_{S1}$, $N_{S2}$, respectively. The primary winding PR is coupled, via the magnetizing inductance $L_{mag}$ to a first output capacitor $C_{out1}$, that provides a first output current $I_{out1}$, at a first output voltage $V_{out}$, at the primary output of the multiple output converter. The first and second synchronous rectifier switches $SR_1$, $SR_2$ are coupled to an output inductor $L_{out}$ and a second output capacitor $C_{out2}$ that provides a second output current $I_{out2}$ at a second output voltage $V_{out2}$ at an auxiliary output of the multiple output converter.

The multiple output converter generally operates as set forth below. During a primary interval, a controller (e.g., a pulse width modulation controller) $CL_{PWM}$ monitors the first output voltage $V_{out1}$ and causes the first switch $Q_1$ to conduct for a primary duty cycle (D) to apply a voltage equal to a difference between the input voltage $V_{in}$ of the first output voltage $V_{out1}$ across the primary winding PR. The controller $CL_{PWM}$, then, transitions the first switch $Q_1$ to a non-conducting state and, during a complementary interval, causes the second switch $Q_2$ to conduct for a complementary duty cycle (1-D). During the complementary interval, an opposite polarity of the input voltage $V_{in}$ is applied across the primary winding PR. The controller $CL_{PWM}$, therein, monitors the first output voltage $V_{out1}$ and controls a duty cycle of the first and second switches $Q_1$, $Q_2$ to maintain the first output voltage $V_{out1}$ and, ultimately, the second output voltage $V_{out2}$, at the desired values.

Thus, the switching action of the first and second switches $Q_1$, $Q_2$ converts a DC input voltage $V_{in}$ into an AC voltage necessary to operate the transformer $T_1$. Additionally, a first output current $I_{out1}$ at a first output voltage $V_{out1}$ is provided via the magnetizing inductance $L_{mag}$ of the transformer $T_1$ at the primary output of the multiple output converter. The first output capacitor $C_{out1}$ filters the first output voltage $V_{out1}$ at the primary output. The first and second secondary windings $SEC_1$, $SEC_2$ of the transformer $T_1$ scale the AC voltage to an appropriate value. The scaled AC voltage is then rectified by the synchronous rectifier and filtered by the second output capacitor $C_{out2}$. A second output current $I_{out2}$ at a second output voltage $V_{out2}$ is provided via the output inductor $L_{out}$ at the auxiliary output of the multiple output converter. Regarding the operation of the controllable switches of the multiple output converter, the first switch $Q_1$ and the second synchronous rectifier switch $SR_2$ primarily conduct during the primary interval of the multiple output converter. Conversely, the second switch $Q_2$ and the first synchronous rectifier switch $SR_1$ primarily conduct during the complementary interval of the multiple output converter.

For a better understanding of the multiple output converter, a more detailed analysis thereof will hereinafter be described. Prior to analyzing the multiple output converter, an objective in designing the converter is to provide multiple regulated output voltages, while at the same time, maintaining a ripple condition within the multiple output converter and a net DC bias across the transformer $T_1$ within acceptable limitations. If the ripple condition and net DC bias are not adequately maintained, the magnetic devices (i.e., the transformer $T_1$ and output inductor $L_{out}$) may become prohibitively larger (including a potential for a core with a large gap) or dampening circuits (such as snubber circuits) may be required in the multiple output converter. As the real estate for the converters continues to shrink and the efficiency targets increase, the aforementioned mitigatory options are becoming less viable. Thus, the multiple output converter is designed, among other things, to manage both the ripple and net DC bias conditions.

Turning now to the operation of the multiple output converter, the first output voltage $V_{out1}$ may be described as follows:

$$V_{out1} = D * V_{in},$$

wherein D represents the duty cycle (also referred to as the primary duty cycle) of the first switch $Q_1$. The second output voltage $V_{out2}$ may be described as follows:

$$V_{out2}=V_{out1}*(1-D)[(N_{S1}+N_{S2})/N_P],$$

wherein (1-D) represents the duty cycle (also referred to as the complementary duty cycle) of the second switch $Q_2$. Thus, as the primary duty cycle D of the first switch $Q_1$ increases, the first output voltage $V_{out1}$ also increases.

Also, as the primary duty cycle D increases between zero and 50 percent, the complementary duty cycle (1-D) of the second switch $Q_2$ decreases from 100 to 50 percent and the second output voltage $V_{out2}$ increases. Conversely, as the primary duty cycle D increases from 50 to 100 percent, the complementary duty cycle (1-D) of the second switch $Q_2$ decreases from 50 to zero percent and the second output voltage $V_{out2}$ also decreases. This parabolic response of the second output voltage $V_{out2}$ to the primary duty cycle D is due, in part, to the functional dependence on the primary and complementary duty cycles D, (1-D).

Additionally, regulating the first output voltage $V_{out1}$ leads to a proper regulation of the second output voltage $V_{out2}$ in accordance with selecting the primary and complementary duty cycles D, (1-D) of the first and second switches $Q_1$, $Q_2$, respectively, as hereinafter described. From the relationships above, the primary duty cycle D of the first switch $Q_1$ may be described as follows:

$$D=½±½*SQR\{1-4V_{out2}/V_{in}*N_P/(N_{S1}+N_{S2})\}.$$

To achieve substantial ripple cancellation on a secondary side of the multiple output converter and within the converter in general, the following relationship:

$$(1-D)*V_{in}(N_{S2}/N_P)=D*V_{in}(N_{S1}/N_P),$$

is solved for the primary duty cycle D of the first switch $Q_1$, yielding:

$$D=N_{S2}/(N_{S1}+N_{S2}).$$

Moreover, under such conditions, the second output voltage $V_{out2}$ may be described by the following relationship:

$$V_{out2}=V_{in}\{(N_{S1}*N_{S2})/[N_P*(N_{S1}+N_{S2})]\}.$$

Thus, the second output voltage $V_{out2}$ is a function of the input voltage $V_{in}$ and the number of turns $N_P$, $N_{S1}$, $N_{S2}$ of the primary winding PR and the first and second secondary windings $SEC_1$, $SEC_2$, respectively, of the transformer $T_1$.

A magnetizing current $I_{mag}$ of the transformer $T_1$ may be represented by:

$$I_{mag}=I_{magDC}+I_{magAC},$$

wherein $I_{magDC}$ is the DC component of the magnetizing current $I_{mag}$ and $I_{magAC}$ is the AC component of the magnetizing current $I_{mag}$. All components of the magnetizing current $I_{mag}$ herein are referenced to a primary side of the transformer $T_1$. The DC component $I_{magDC}$ of the magnetizing current $I_{mag}$ may be represented by:

$$I_{magDC}=I_{magDC1}+I_{magDC2},$$

wherein $I_{magDC1}$ is a DC bias current associated with a primary side of the multiple output converter (which is equal to the first output current $I_{out1}$ in the illustrated embodiment), and $I_{magDC2}$ is a DC bias current associated with a secondary side of the multiple output converter.

Another set of relationships are evaluated to analyze the net DC bias across the transformer $T_1$. The analysis begins with the DC bias current $I_{magDC2}$ associated with the secondary side of the multiple output converter as set forth below:

$$I_{magDC2}=[N_{S1}/N_P*I_{out2}]-[D*(N_{S1}+N_{S2})/N_P*I_{out2}].$$

It should be understood that the DC bias current $I_{magDC2}$ associated with the secondary side of the multiple output converter across the transformer $T_1$ may be either a positive or negative value. The DC bias current $I_{magDc2}$ associated with the secondary side of the multiple output converter is added to the DC bias current $I_{magDC1}$ associated with the primary side of the multiple output converter (which, again, is the first output current $I_{out1}$) to yield the DC component $I_{magDC}$ (also referred to as a net DC bias current) of the magnetizing current $I_{mag}$ represented by:

$$I_{magDC}=I_{out1}+[N_{S1}/N_P*I_{out2}]-[D*(N_{S1}+N_{S2})/N_P*I_{out2}].$$

Employing the above relationship to ascertain the primary duty cycle D of the first switch $Q_1$ for a substantially zero DC bias current $I_{magDC2}$ associated with the secondary side of the multiple output converter provides the following relationship:

$$D=N_{S1}/(N_{S1}+N_{S2}).$$

Thus, if the primary duty cycle D of the first switch $Q_1$ is greater than the value of the turns ratio as described above, the DC bias current $I_{magDC2}$ associated with the secondary side of the multiple output converter across the transformer $T_1$ is negative.

It is also possible to select the primary duty cycle D of the first switch $Q_1$ to achieve both substantial ripple cancellation and a substantially zero net DC bias current $I_{magDC}$ across the transformer $T_1$. More specifically, by selecting the primary duty cycle D of the first switch $Q_1$ according to:

$$D=N_{S2}/(N_{S1}+N_{S2}),$$

a substantial ripple cancellation in the secondary side of the multiple output converter and the converter in general can be achieved. The DC bias current $I_{magDC2}$ associated with the secondary side of the multiple output converter may be negative. The negative value of the DC bias current $I_{magDC2}$ associated with the secondary side of the multiple output converter may be offset by a positive DC bias current $I_{magDC1}$ associated with the primary side of the multiple output converter thereby providing a substantially zero net DC bias current $I_{magDC}$ across the transformer $T_1$ of the multiple output converter.

The advantages of designing the multiple output converter under such conditions provides an overall reduction in the size of the magnetic components thereof. More specifically, the output inductor $L_{out}$ may be downsized because the magnetic device does not have to accommodate a substantial ripple current in the secondary side of the multiple output converter. Additionally, the transformer $T_1$ may not need a substantial gap, if any at all, in the magnetic core thereof to accommodate a large net DC bias thereacross. Mitigating the need for a substantial gap in the core of the transformer $T_1$ allows for several advantages such as a substantially larger magnetizing inductance $L_{mag}$ for a given size of a magnetic device. Additionally, a larger magnetizing inductance $L_{mag}$ could be applied to filter the first output voltage $V_{out1}$ of the multiple output converter.

An exemplary design will hereinafter be described to demonstrate the principles as stated above. The following values are submitted in Table I below for selected components of the multiple output converter:

TABLE I

| Parameter/Component | Reference | Value |
| --- | --- | --- |
| Input Voltage | $V_{in}$ | 18 volts |
| Number of turns of the primary winding PR | $N_P$ | 3 |
| Number of turns of the first secondary winding $SEC_1$ | $N_{S1}$ | 3 |
| Number of turns of the second secondary winding $SEC_2$ | $N_{S2}$ | 6 |
| Switching frequency of the first and second switches $Q_1$, $Q_2$ | f | 300 kHz |
| First output voltage | $V_{out1}$ | 12 volts |
| First output current | $I_{out1}$ | 5 amps |
| Second output voltage | $V_{out2}$ | 12 volts |
| Second output current | $I_{out2}$ | 1 amp |
| Primary duty cycle of the first switch $Q_1$ | D | 0.67 |
| Complementary duty cycle of the second switch $Q_2$ | 1-D | 0.33 |

Employing the values as stated above for selected components yields substantial ripple cancellation in the secondary side of the multiple output converter thereby allowing the output inductor $L_{out}$ to be relatively small (e.g., 1 $\mu$H). Additionally, the DC bias current $I_{magDC2}$ associated with the secondary side of the multiple output converter is about a negative one amp resulting in a DC component $I_{magDC}$ of the magnetizing current $I_{mag}$ of a positive four amps thereby allowing for a larger inductance (e.g., 4 $\mu$H) in a smaller core than would have been possible with an unbiased DC component $I_{magDC}$ of the magnetizing current $I_{mag}$ of a positive five amps. As a result, the size of the transformer $T_1$ and the output inductor $L_{out}$ are relatively small in comparison to other converters attempting to provide analogous power under like conditions. Taking the design a step further, if the first output current $I_{out1}$ at the primary output is limited to one amp, it is possible to achieve a substantially zero DC component $I_{magDC}$ of the magnetizing current $I_{mag}$ across the transformer $T_1$ thereby further reducing the gap, or removing it altogether, in the core thereof.

The following FIGUREs and associated discussions provide waveform diagrams of exemplary operations of the multiple output converter of FIG. 1 at selected operating conditions. Unless otherwise noted, the parameters/component values are as submitted above in Table I.

Turning now to FIGS. 2A–2F, illustrated are waveform diagrams of an exemplary operation of the multiple output converter of FIG. 1 at selected operating conditions according to the principles of the present invention. More specifically, the primary output provides a first output current $I_{out1}$ of five amps at a first output voltage $V_{out1}$ of 12 volts and the auxiliary output provides a second output current $I_{out2}$ of one amp at a second output voltage $V_{out2}$ of 12 volts.

Figure 2A:
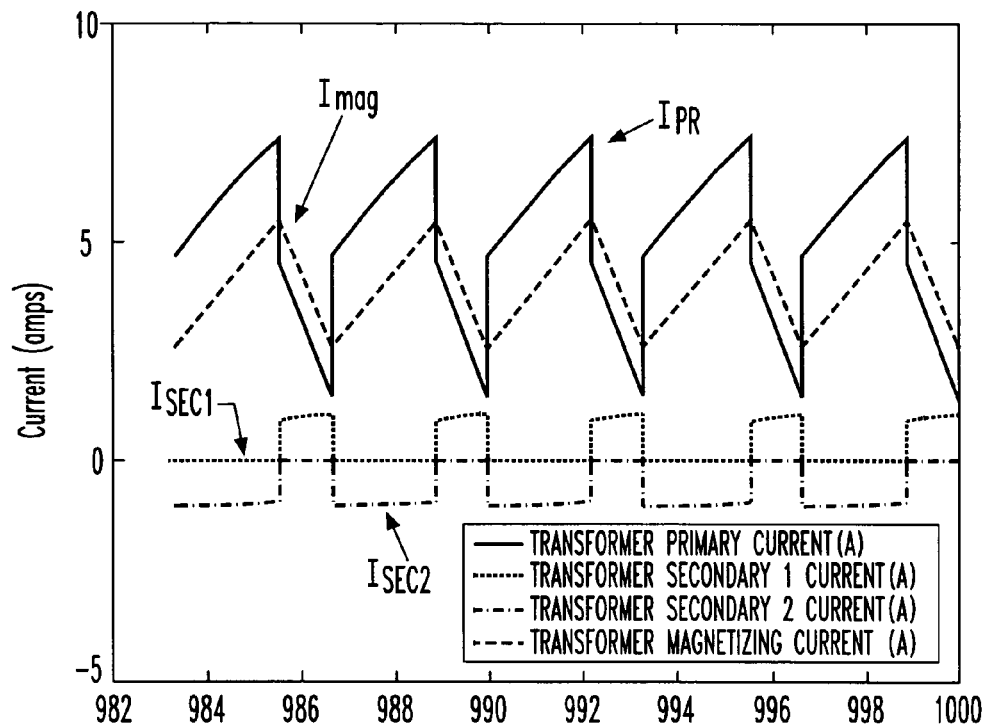
FIGS. 2A–2F illustrate waveform diagrams of an exemplary operation of the multiple output converter of FIG. 1 at selected operating conditions according to the principles of the present invention.
Figure 2B:
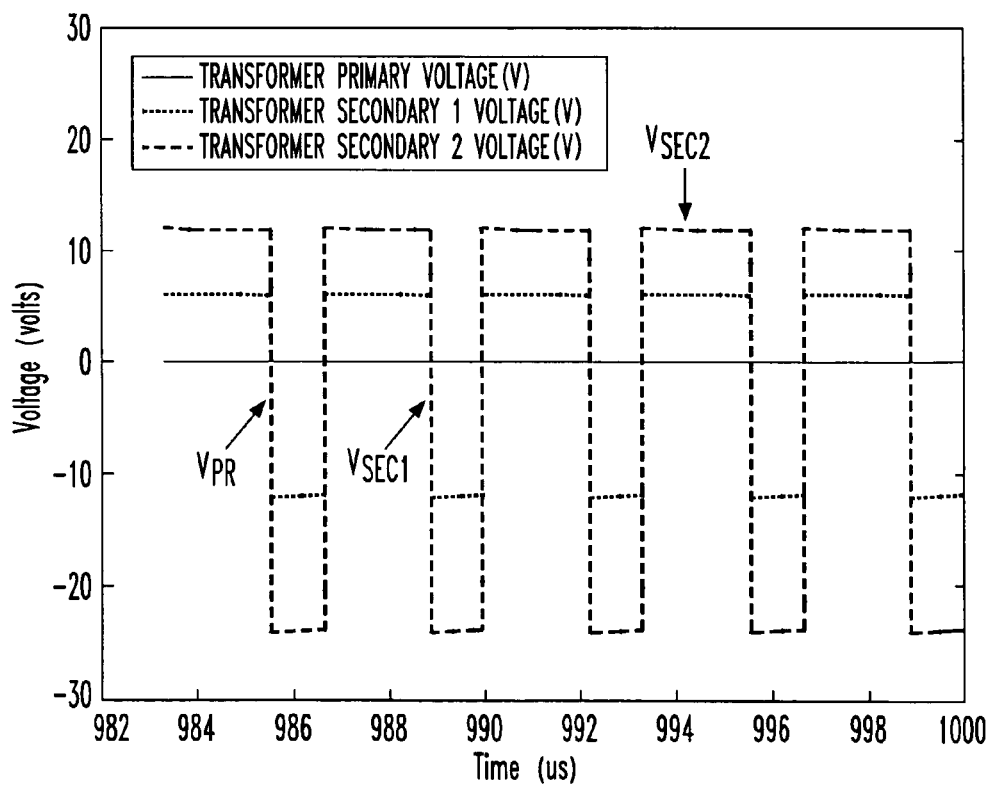
Figure 2C:
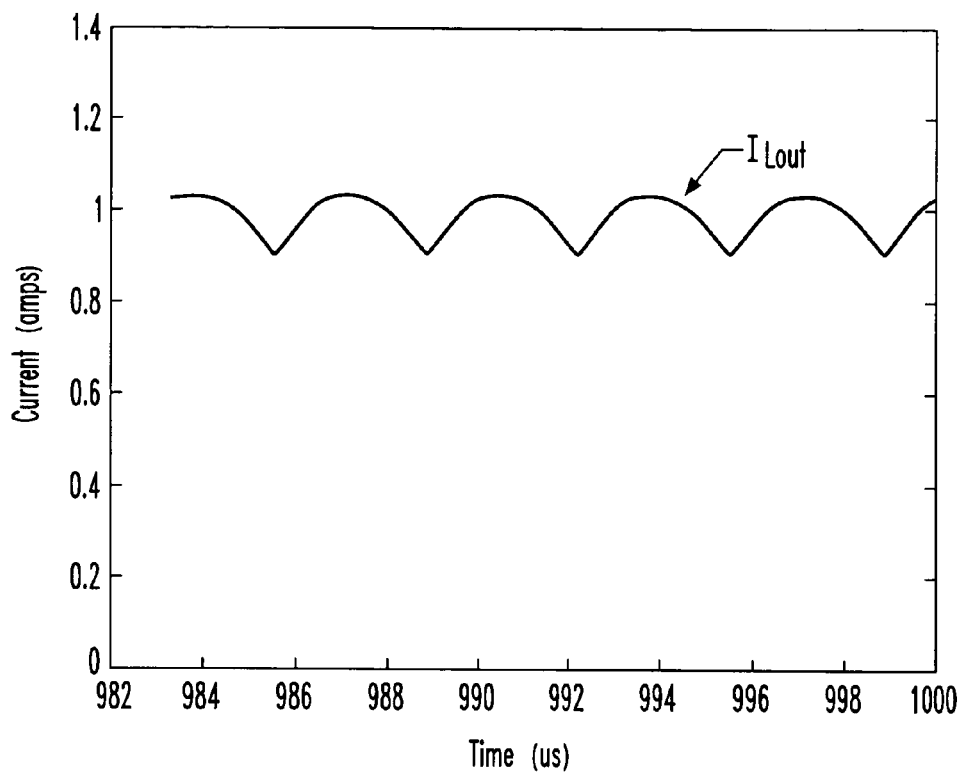
Figure 2D:
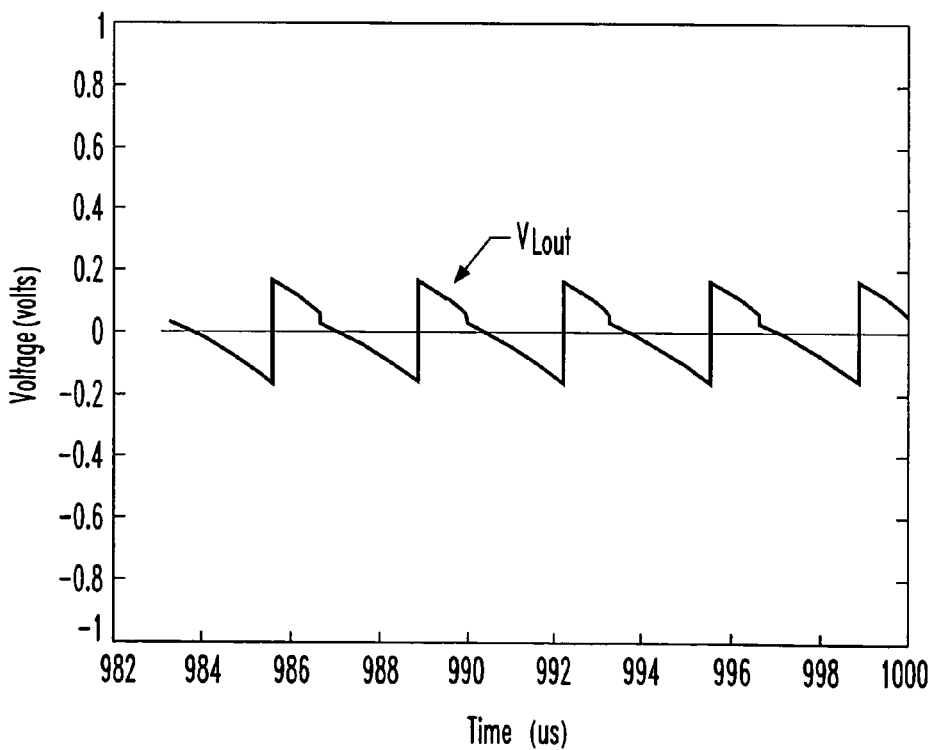

As illustrated by FIG. 2A, a DC component $I_{magDC}$ of the magnetizing current $I_{mag}$ associated with the transformer $T_1$ is a positive four amps which is less than an unbiased DC component $I_{magDC}$ of the magnetizing current $I_{mag}$ of a positive five amps. Furthermore, as illustrated by FIGS. 2C and 2D, the output inductor $L_{out}$ demonstrates a small inductor ripple current $I_{Lout}$ and small inductor ripple voltage $V_{Lout}$. Additionally, as illustrated by FIGS. 2E and 2F, the first output current $I_{out1}$ and first output voltage $V_{out1}$ at the primary output also exhibit a small ripple condition.

Turning now to FIGS. 3A–3F, illustrated are waveform diagrams of another exemplary operation of the multiple output converter of FIG. 1 at selected operating conditions according to the principles of the present invention. More specifically, the primary output provides a first output current $I_{out1}$ of five amps at a first output voltage $V_{out1}$ of 12 volts and the auxiliary output provides a second output current $I_{out2}$ of zero amps at a second output voltage $V_{out2}$ of 12 volts.

Figure 3A:
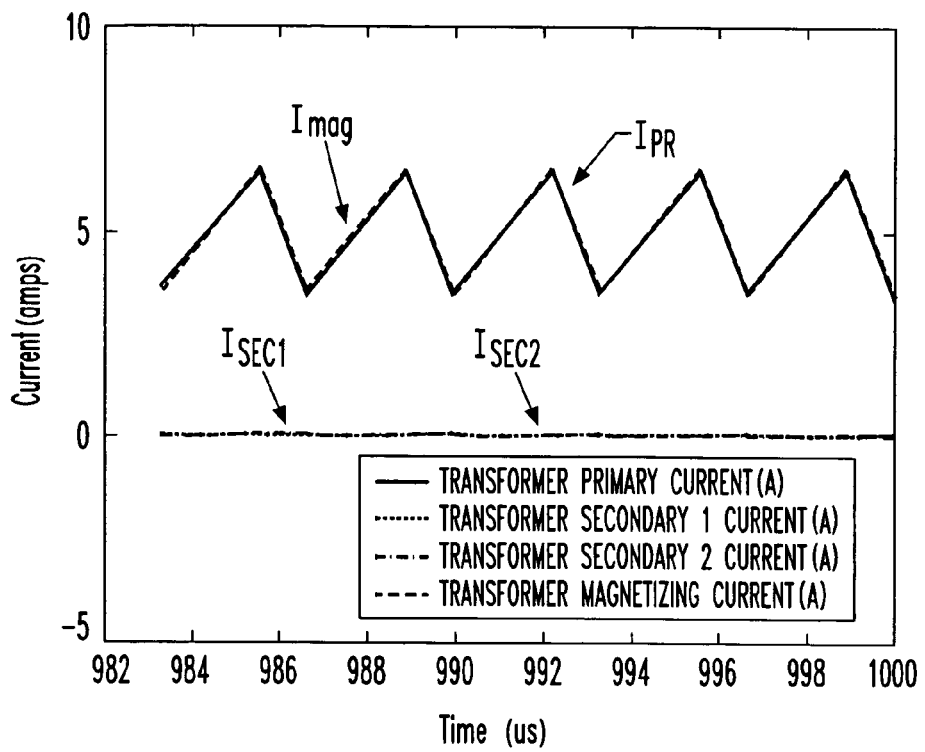
FIGS. 3A–3F illustrate waveform diagrams of another exemplary operation of the multiple output converter of FIG. 1 at selected operating conditions according to the principles of the present invention.
Figure 3B:
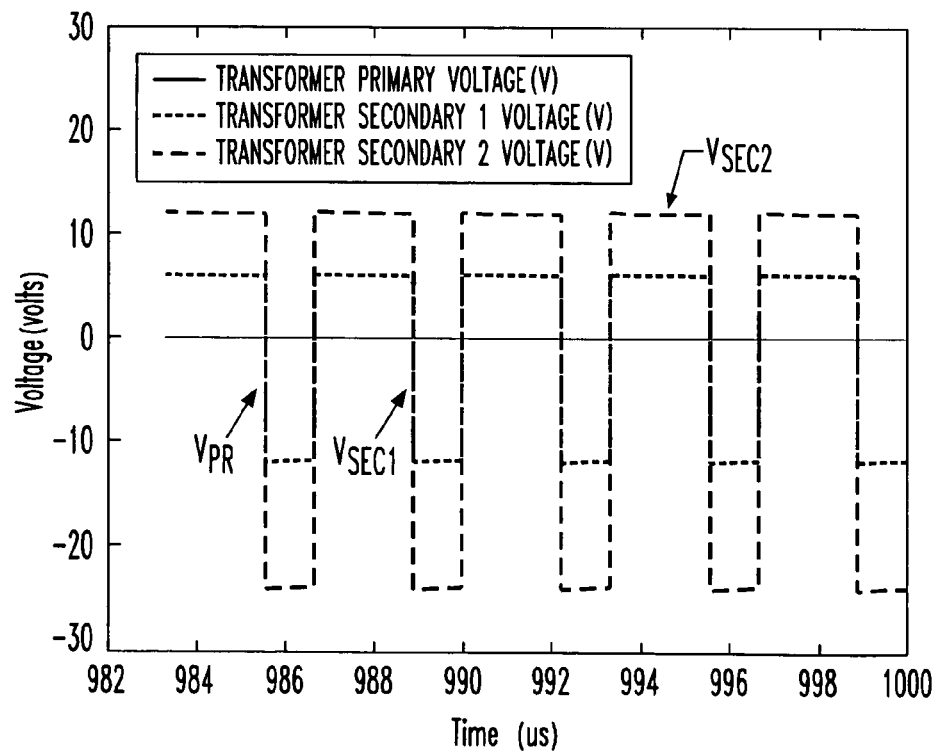
Figure 3C:
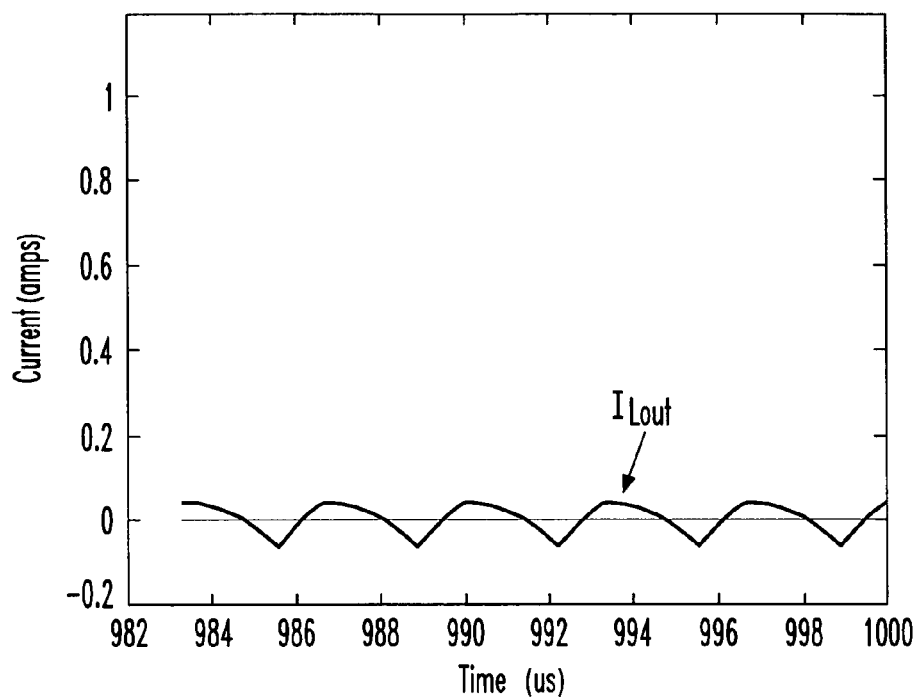
Figure 3D:
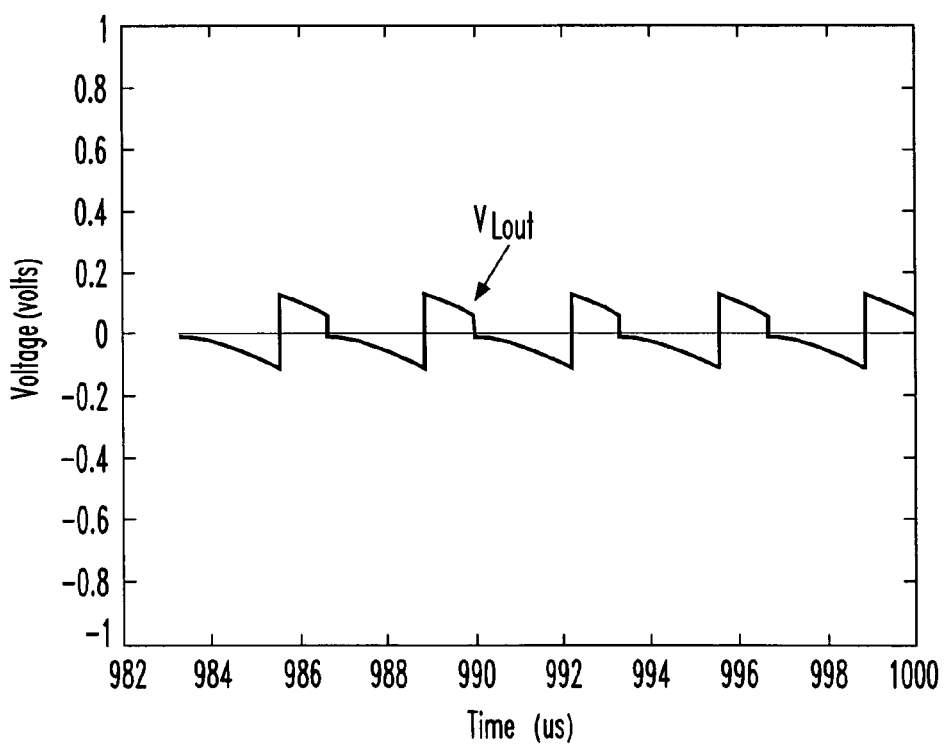

As illustrated by FIG. 3A, a DC component $I_{magDC}$ of the magnetizing current $I_{mag}$ associated with the transformer $T_1$ is a positive five amps. Furthermore, as illustrated by FIGS. 3C and 3D, the output inductor $L_{out}$ demonstrates a small inductor ripple current $I_{Lout}$ and small inductor ripple voltage $V_{Lout}$. Additionally, as illustrated by FIGS. 3E and 3F, the first output current $I_{out1}$ and first output voltage $V_{out1}$ at the primary output also exhibit a small ripple condition.

Figure 2E:
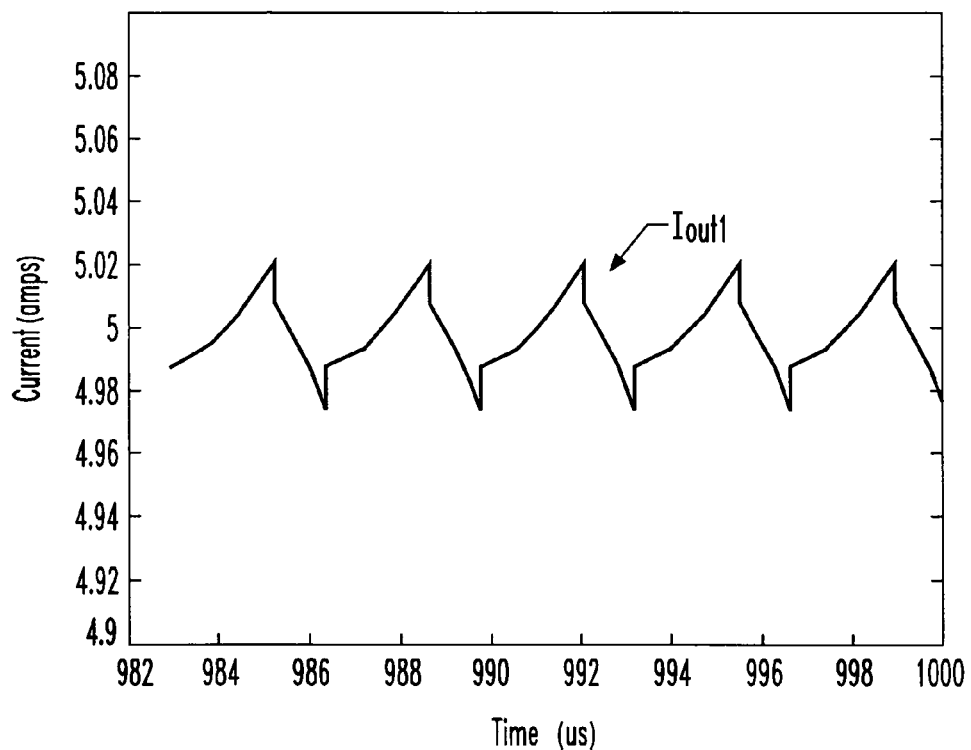
Figure 2F:
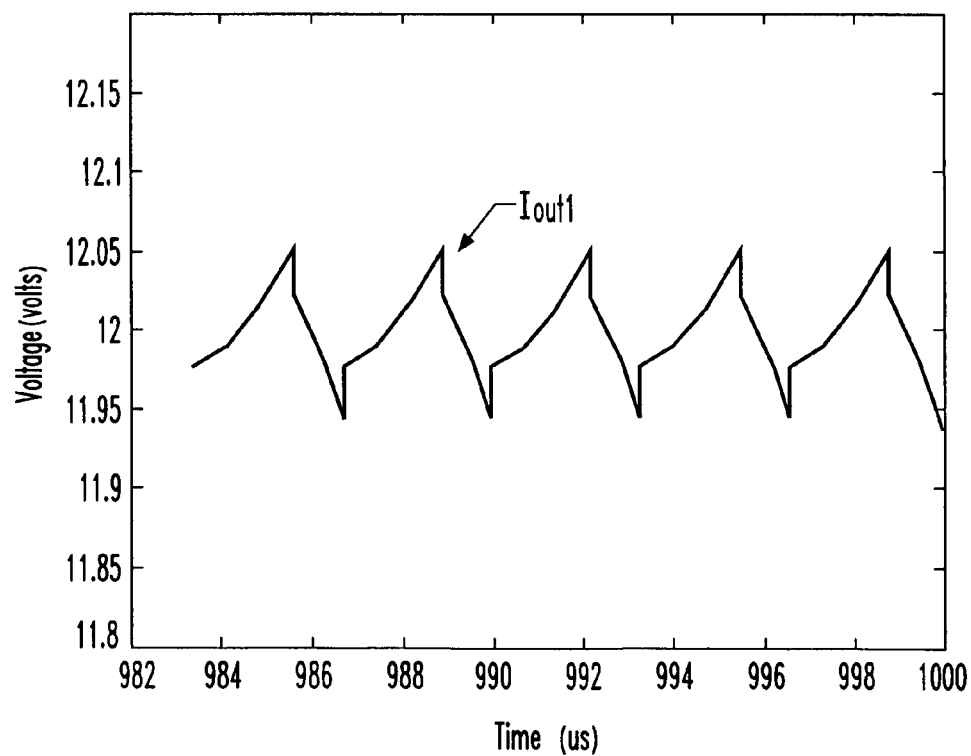
Figure 3E:
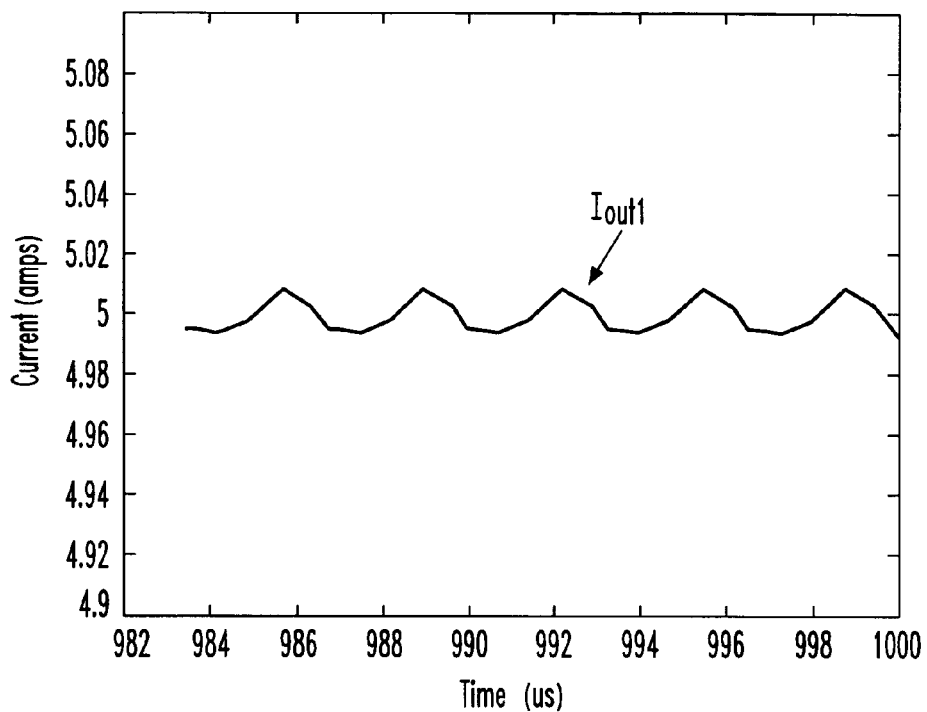
Figure 3F:
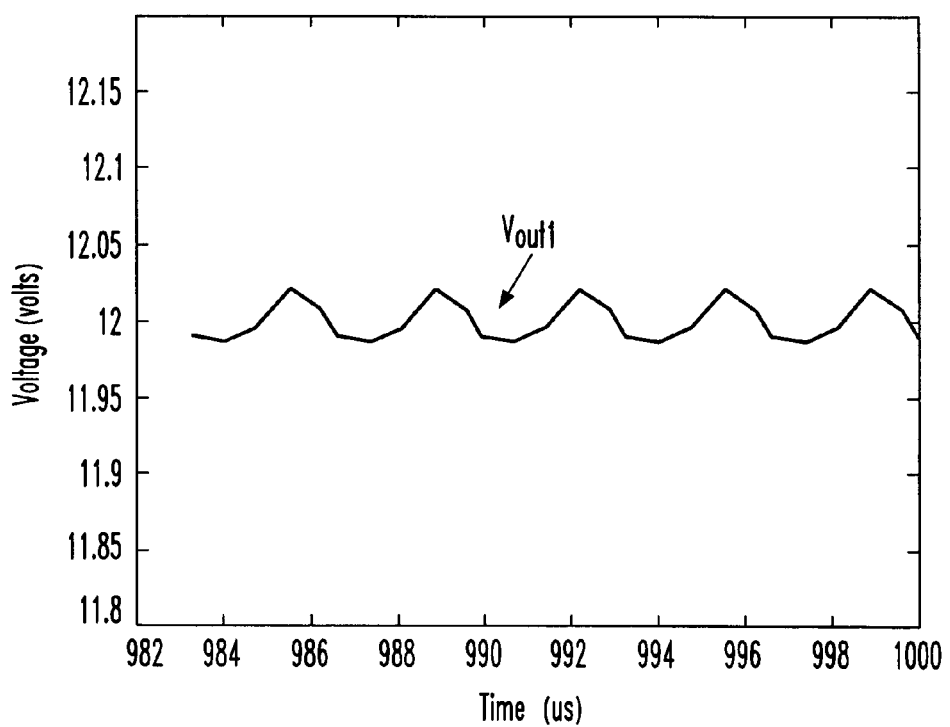

In comparison to the operating conditions illustrated and described with respect to FIGS. 2E and 2F, the waveform diagrams of FIGS. 3E and 3F demonstrate a reduced ripple condition for the first output current $I_{out1}$ and first output voltage $V_{out1}$. The relatively larger ripple condition for the first output current $I_{out1}$ and first output voltage $V_{out1}$ illustrated in FIGS. 2E and 2F may be attributed to a switching of a substantially non-zero current on the secondary side of transformer $T_1$.

Turning now to FIGS. 4A–4F, illustrated are waveform diagrams of another exemplary operation of the multiple output converter of FIG. 1 at selected operating conditions according to the principles of the present invention. More specifically, the primary output provides a first output current $I_{out1}$ of zero amps at a first output voltage $V_{out1}$ of 12 volts and the auxiliary output provides a second output current $I_{out2}$ of zero amps at a second output voltage $V_{out2}$ of 12 volts.

Figure 4A:
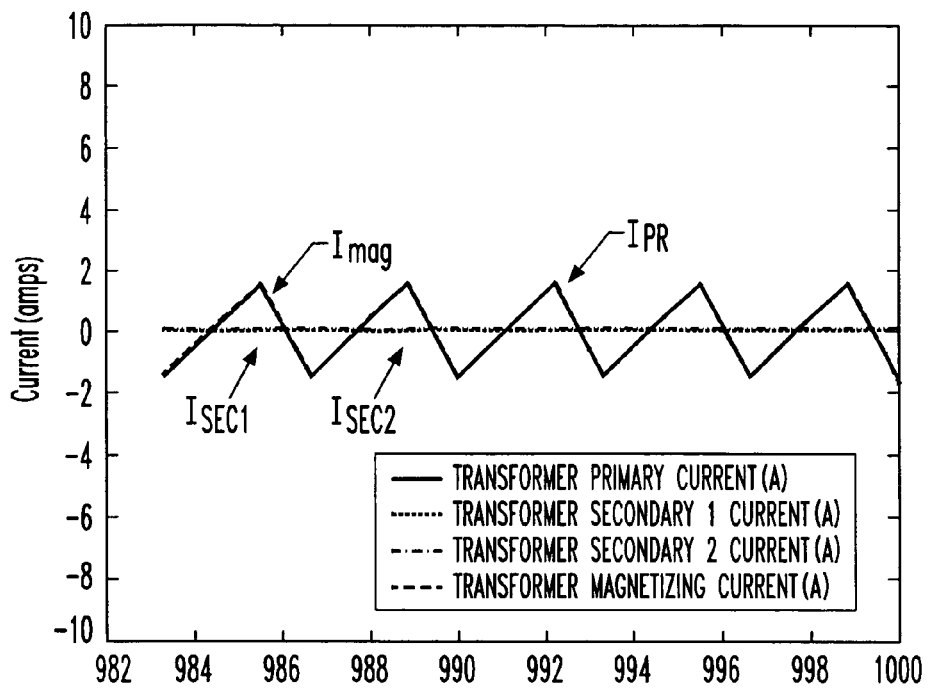
FIGS. 4A–4F illustrate waveform diagrams of another exemplary operation of the multiple output converter of FIG. 1 at selected operating conditions according to the principles of the present invention.
Figure 4B:
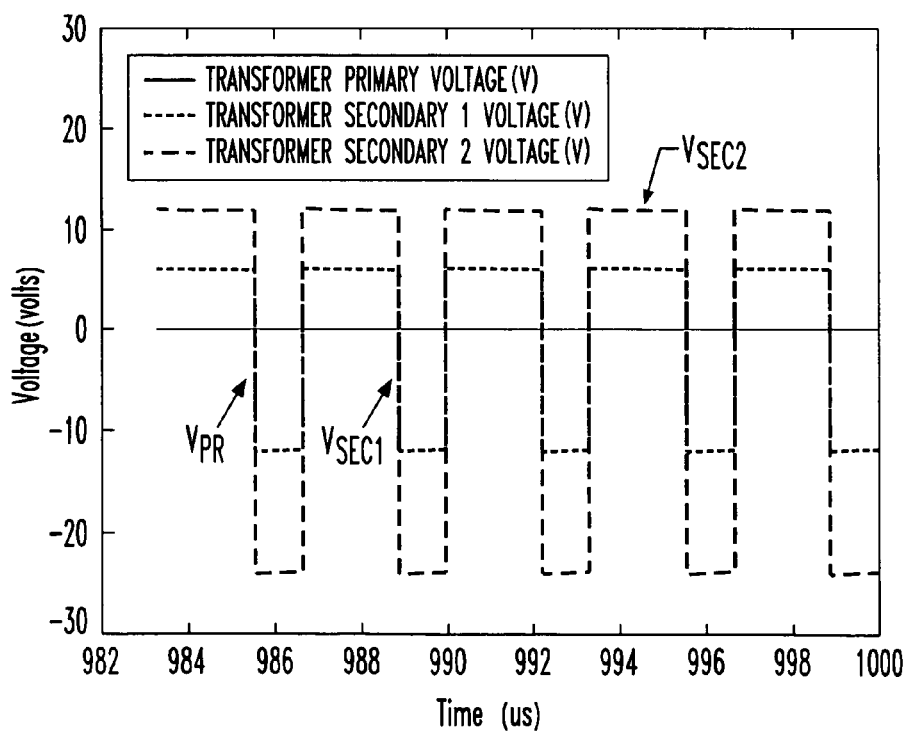
Figure 4C:
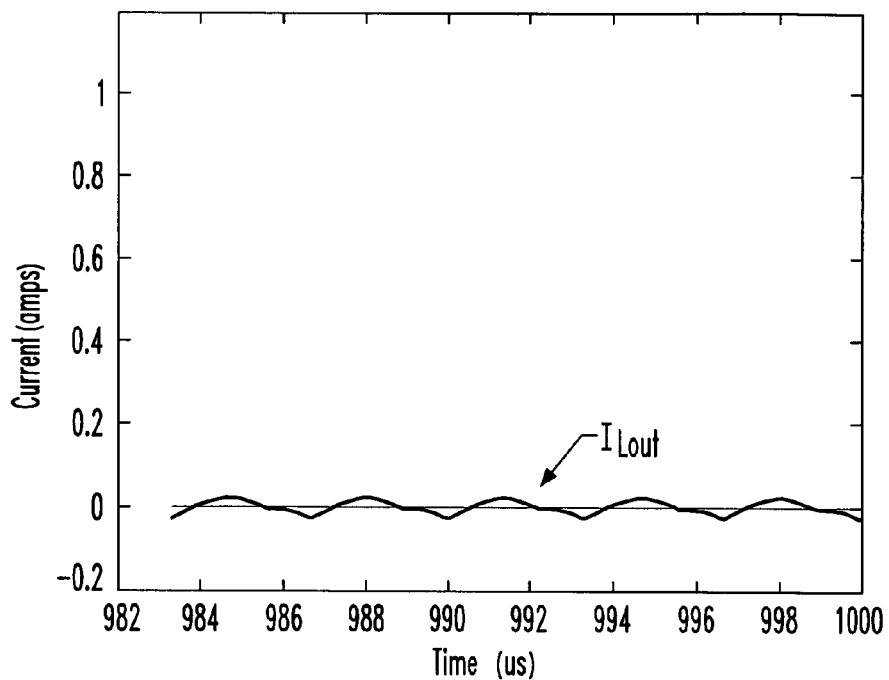
Figure 4D:
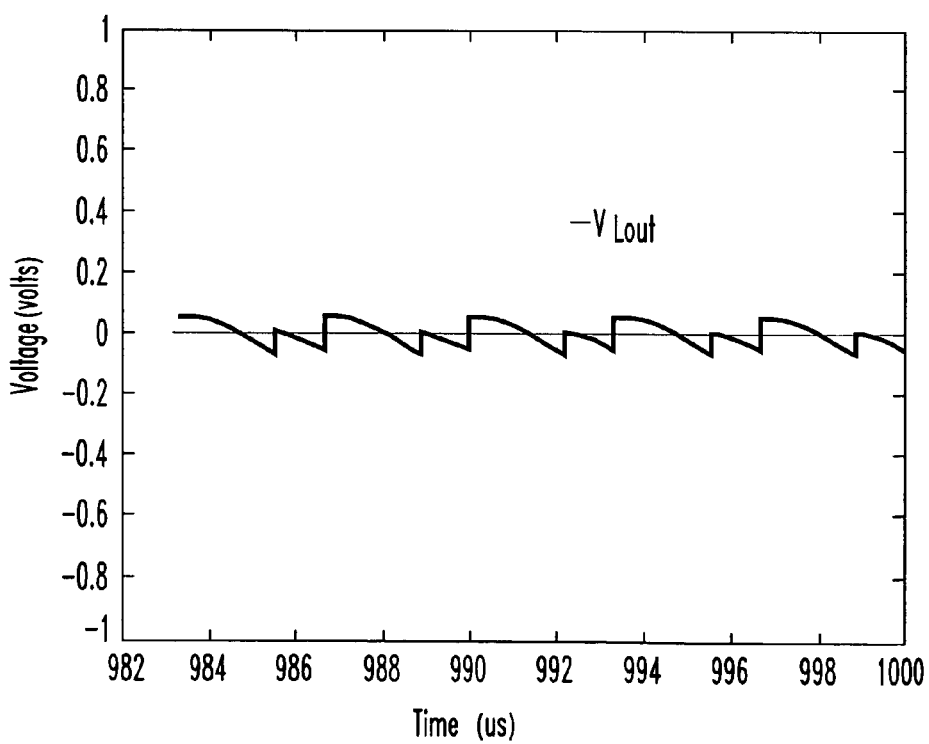
Figure 4E:
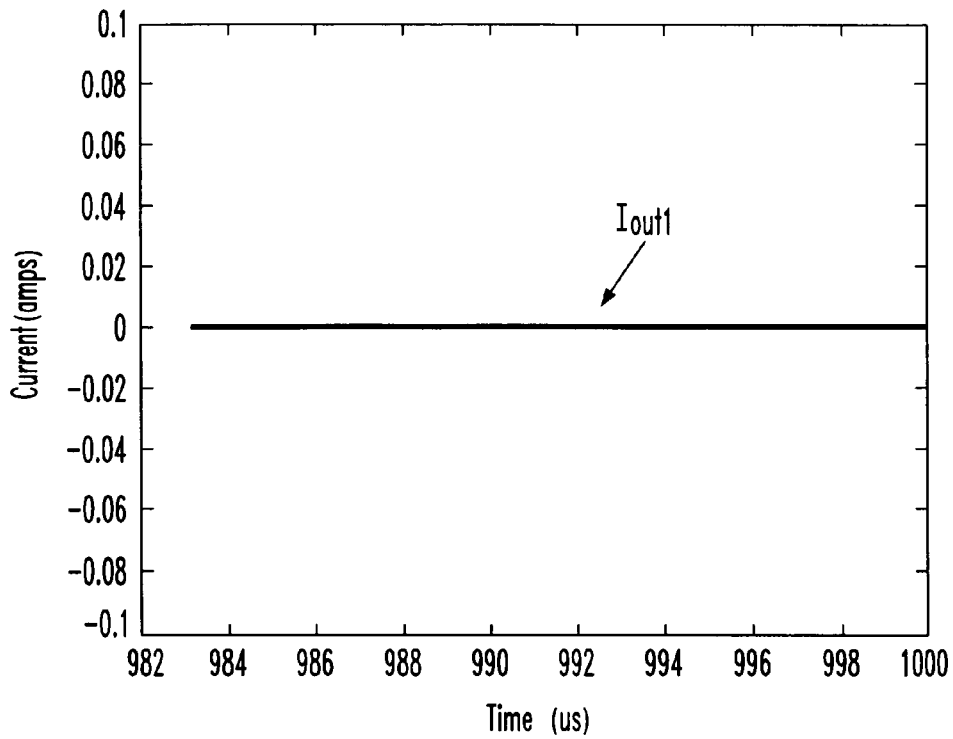
Figure 4F:
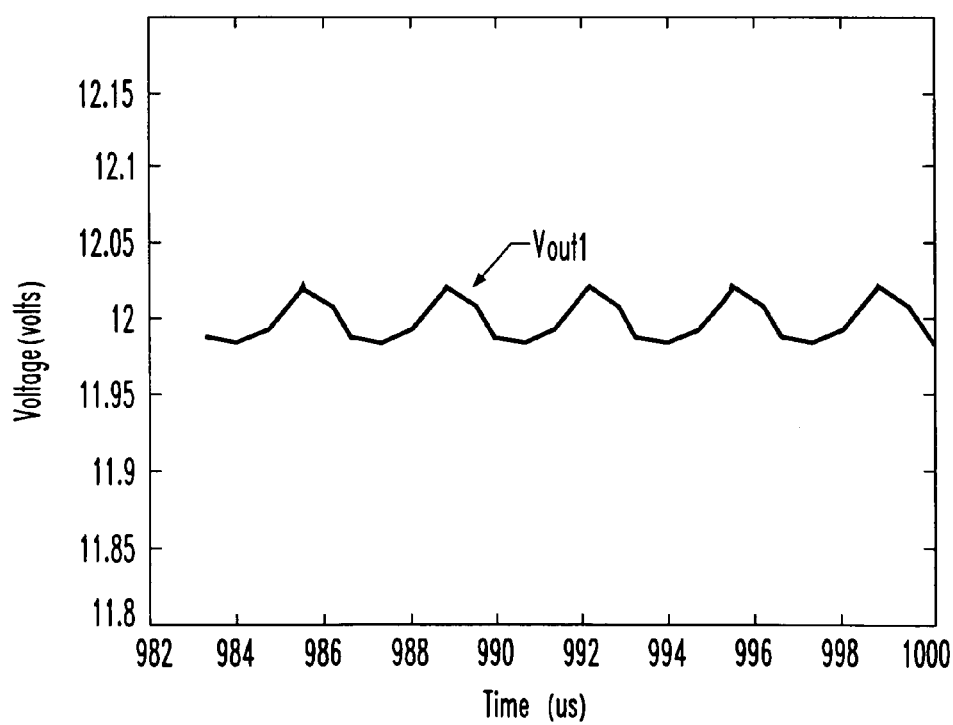

As illustrated by FIG. 4A, a DC component $I_{magDC}$ of the magnetizing current $I_{mag}$ associated with the transformer $T_1$ is zero amps thereby providing a substantially zero net DC bias across the transformer $T_1$. Furthermore, as illustrated by FIGS. 4C and 4D, the output inductor $L_{out}$ demonstrates a small inductor ripple current $I_{out}$ and small inductor ripple voltage $V_{Lout}$. Additionally, as illustrated by FIGS. 4E and 4F, while the first output current $I_{out1}$ demonstrates a zero ripple current, the first output voltage $V_{out1}$ at the primary output exhibits a small ripple voltage.

Turning now to FIGS. 5A–5F, illustrated are waveform diagrams of another exemplary operation of the multiple output converter of FIG. 1 at selected operating conditions according to the principles of the present invention. More specifically, the primary output provides a first output current $I_{out1}$ of zero amps at a first output voltage $V_{out1}$ of 12 volts and the auxiliary output provides a second output current $I_{out2}$ of one amp at a second output voltage $V_{out2}$ of 12 volts.

Figure 5A:
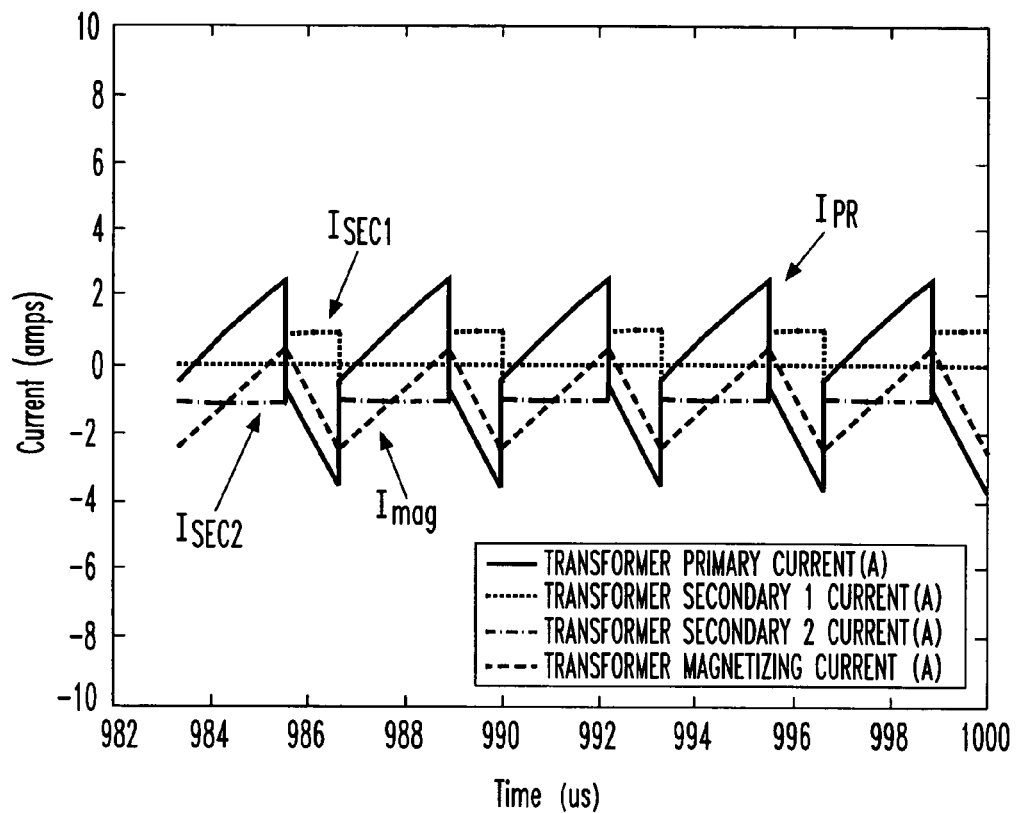
FIGS. 5A–5F illustrate waveform diagrams of another exemplary operation of the multiple output converter of FIG. 1 at selected operating conditions according to the principles of the present invention.
Figure 5B:
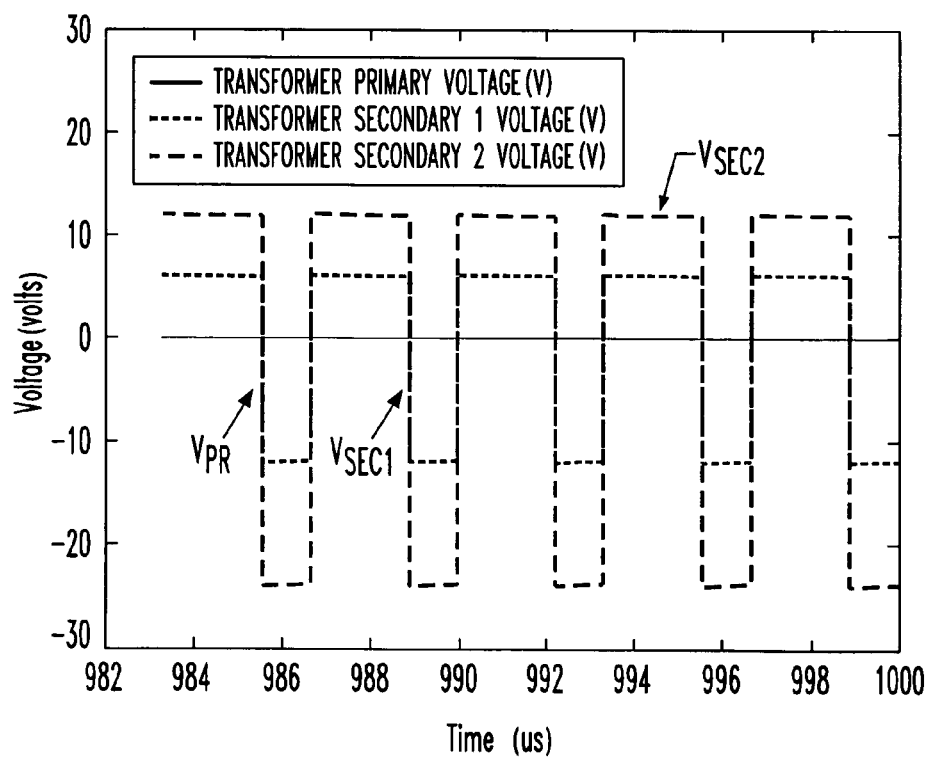
Figure 5C:
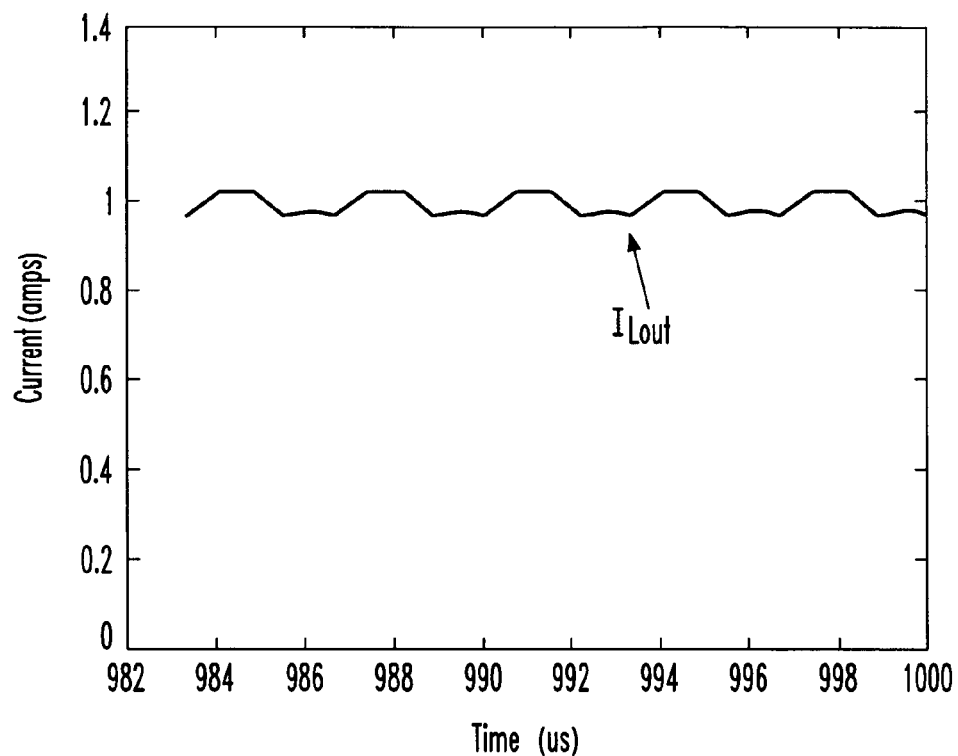
Figure 5D:
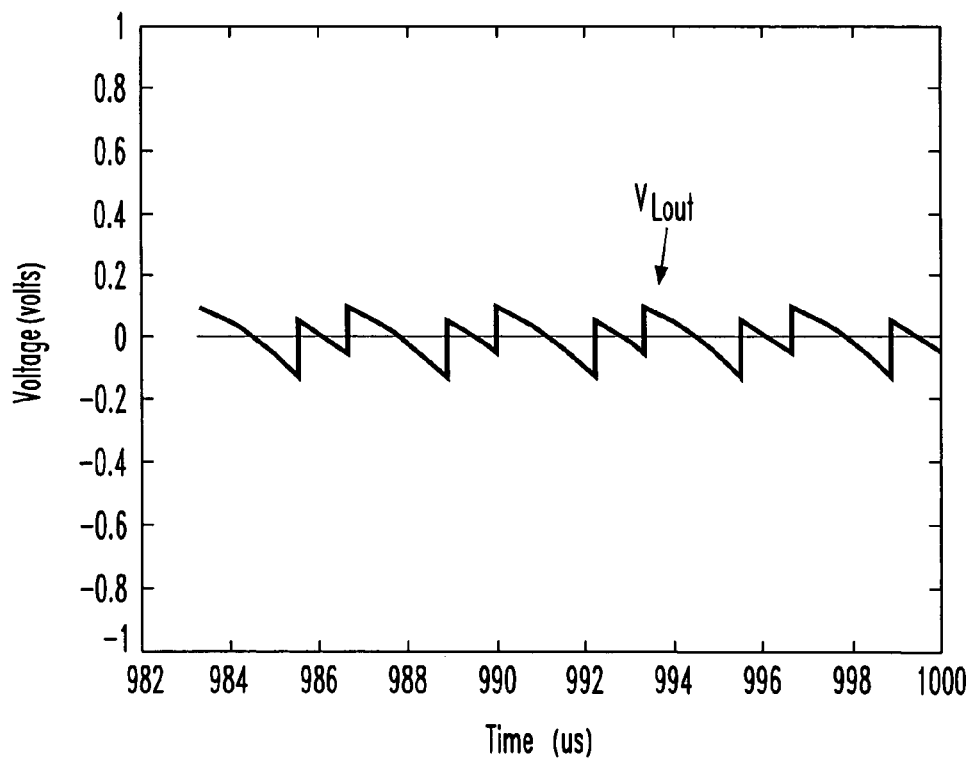
Figure 5E:
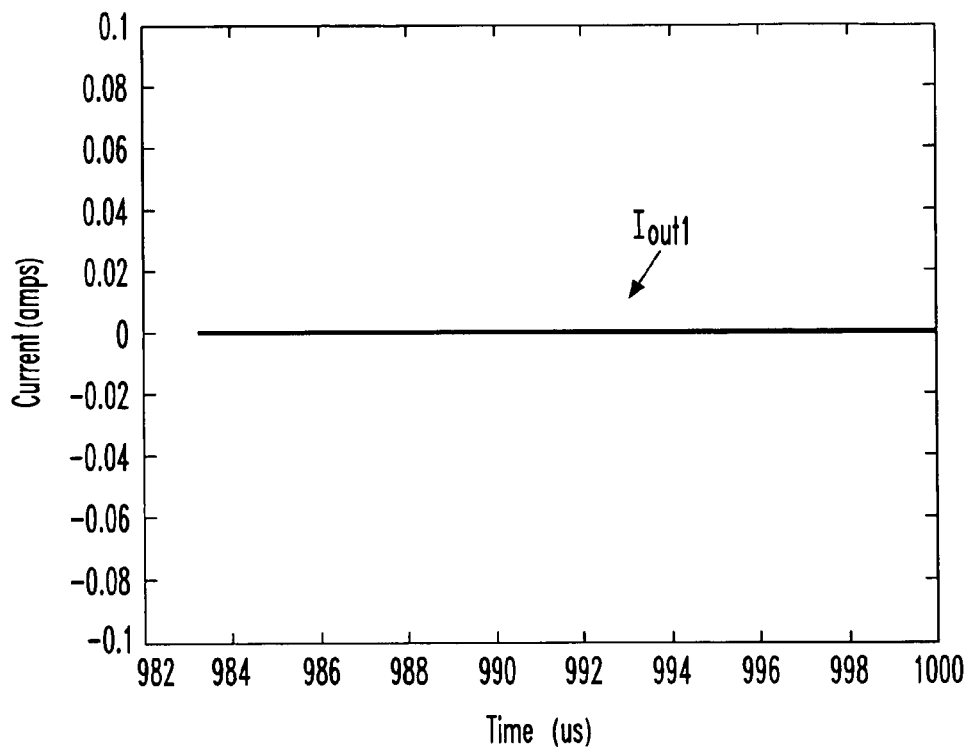
Figure 5F:
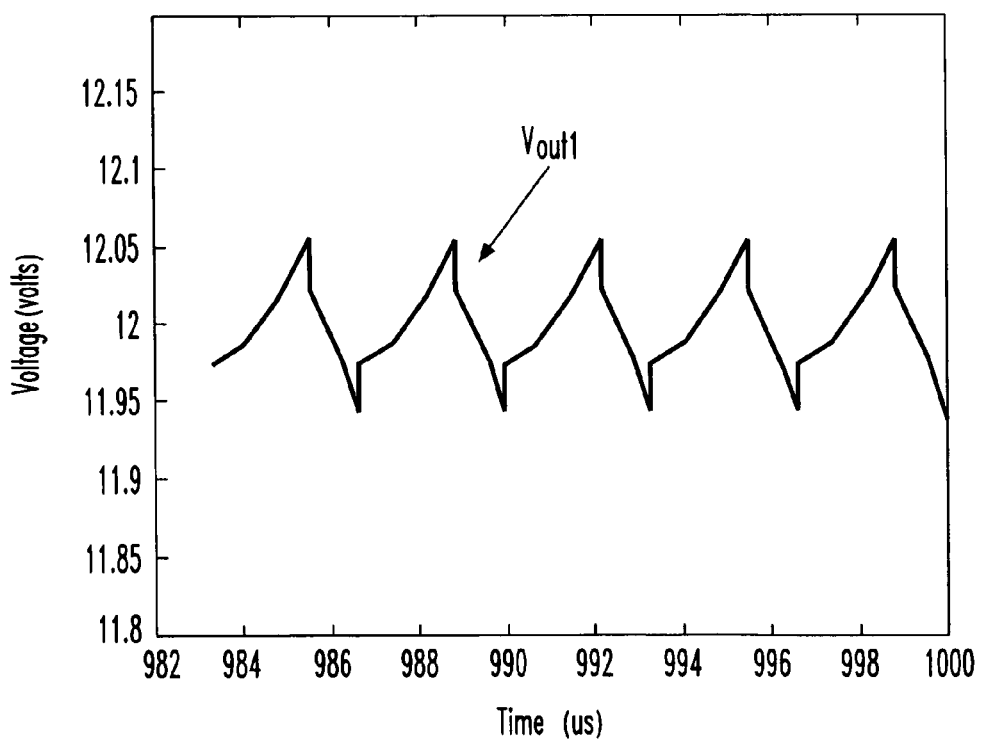

As illustrated by FIG. 5A, a DC component $I_{magDC}$ of the magnetizing current $I_{mag}$ associated with the transformer $T_1$ is a negative one amp. Furthermore, as illustrated by FIGS. 5C and 5D, the output inductor $L_{out}$ demonstrates a small inductor ripple current $I_{Lout}$ and small inductor ripple voltage $V_{Lout}$. Additionally, as illustrated by FIGS. 5E and 5F, while the first output current $I_{out1}$ demonstrates a zero ripple current, the first output voltage $V_{out1}$ at the primary output exhibits a small ripple voltage.

In comparison to the operating conditions illustrated and described with respect to FIG. 2C, the waveform diagram of FIG. 5C demonstrates a reduced inductor ripple current $I_{Lout}$. The relatively larger inductor ripple current $I_{Lout}$ illustrated in FIG. 2C may be attributed to switching of a substantially non-zero current on the primary side of transformer $T_1$.

Turning now to FIGS. 6A–6F, illustrated are waveform diagrams of another exemplary operation of the multiple output converter of FIG. 1 at selected operating conditions according to the principles of the present invention. More specifically, the primary output provides a first output current $I_{out1}$ of one amp at a first output voltage $V_{out1}$ of 12 volts and the auxiliary output provides a second output current $I_{out2}$ of zero amps at a second output voltage $V_{out2}$ of 12 volts.

Figure 6A:
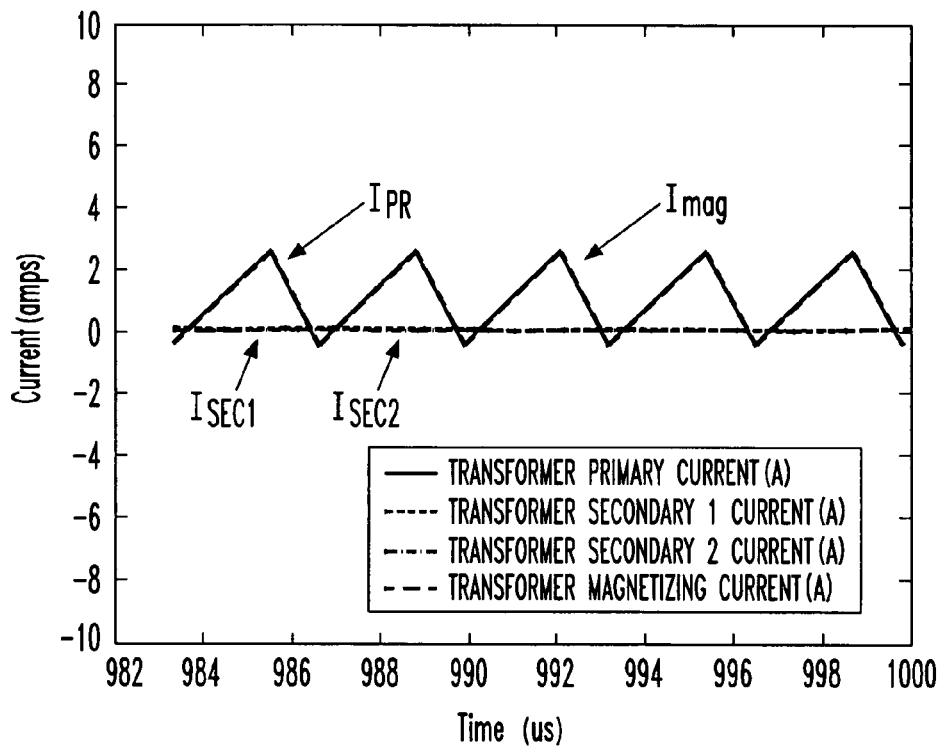
FIGS. 6A–6F illustrate waveform diagrams of another exemplary operation of the multiple output converter of FIG. 1 at selected operating conditions according to the principles of the present invention.
Figure 6B:
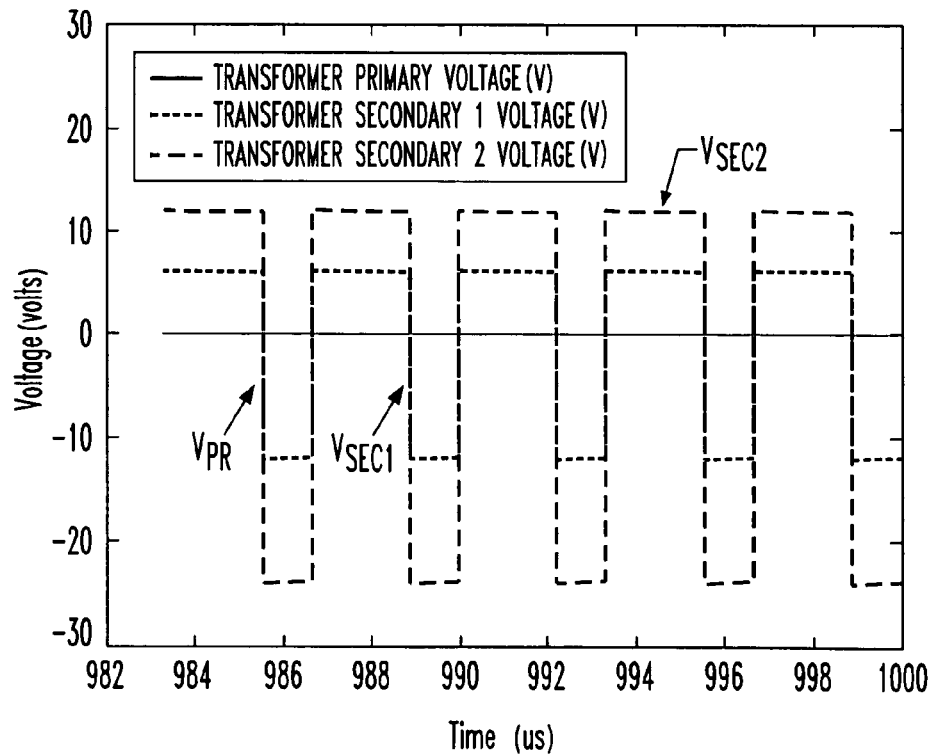
Figure 6C:
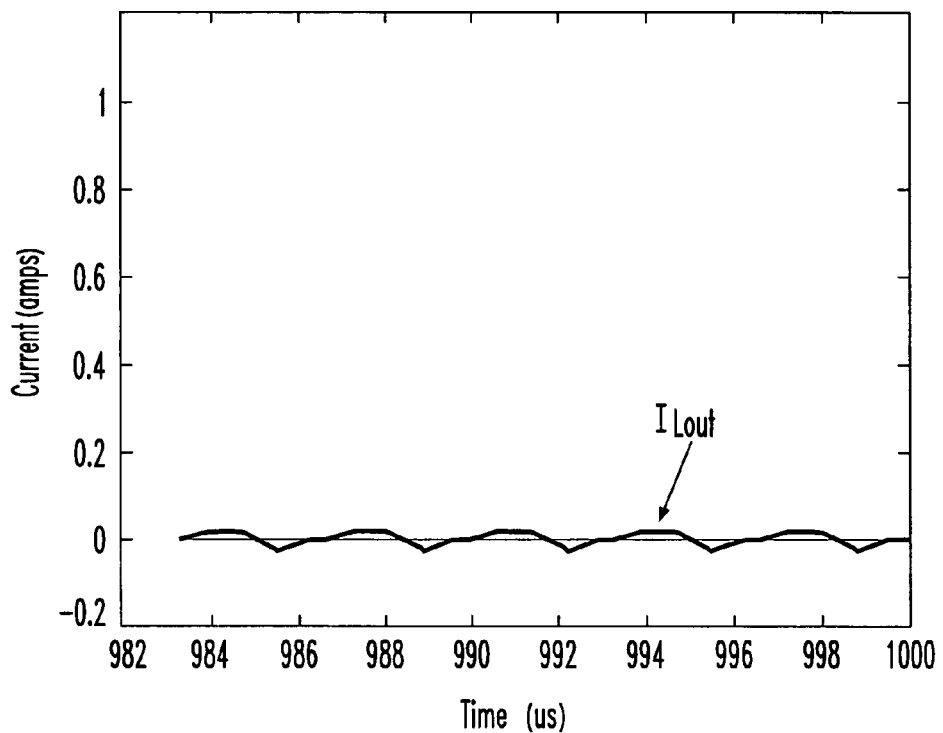
Figure 6D:
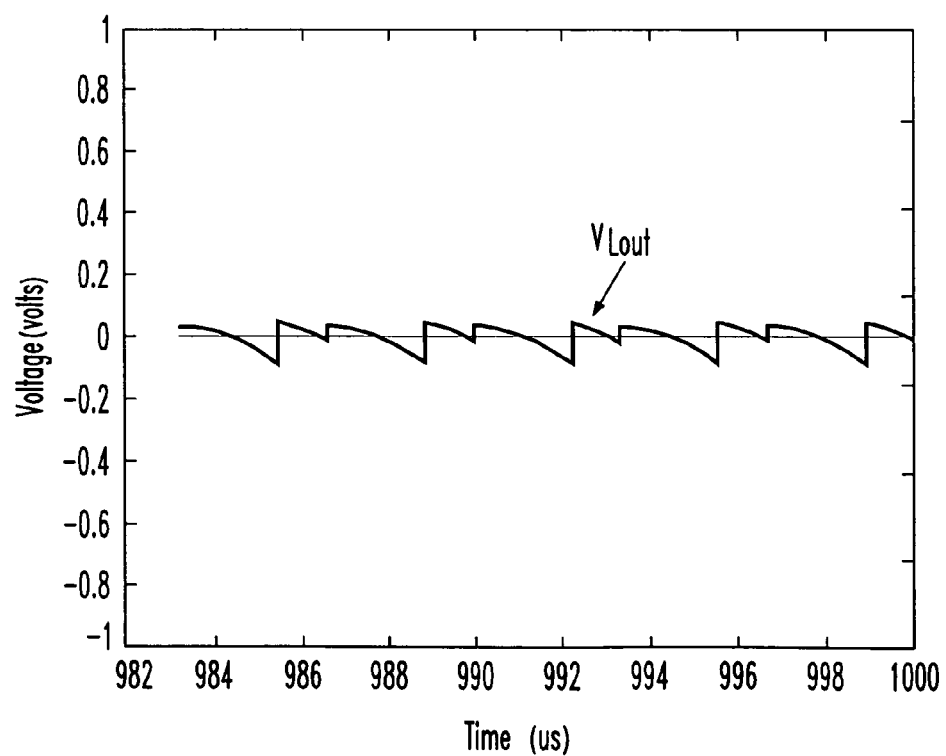
Figure 6E:
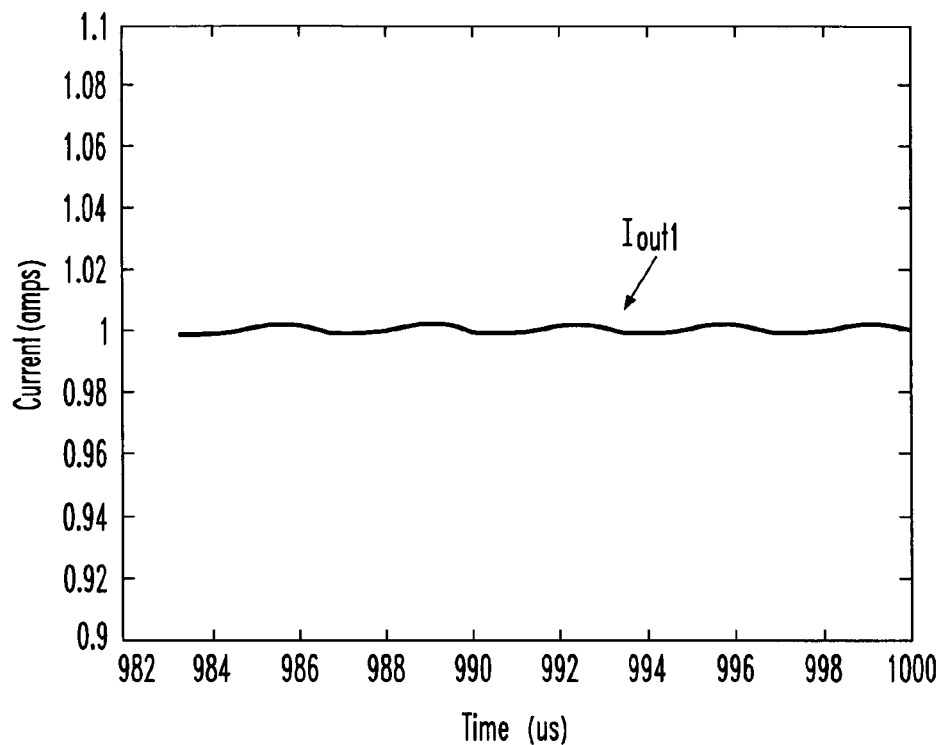
Figure 6F:
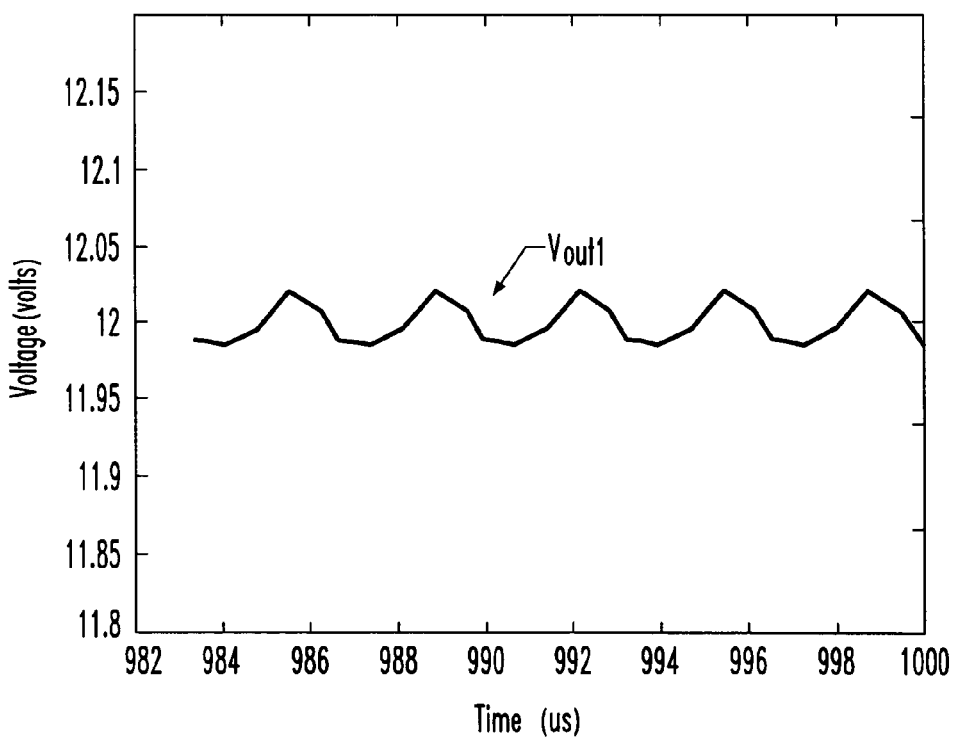

As illustrated by FIG. 6A, a DC component $I_{magDC}$ of the magnetizing current $I_{mag}$ associated with the transformer $T_1$ is a positive one amp. Furthermore, as illustrated by FIGS. 6C and 6D, the output inductor $L_{out}$ demonstrates a small inductor ripple current $I_{Lout}$ and small inductor ripple voltage $V_{Lout}$. Additionally, as illustrated by FIGS. 6E and 6F, the first output current $I_{out1}$ and first output voltage $V_{out1}$ at the primary output also exhibit a small ripple condition.

Turning now to FIGS. 7A–7F, illustrated are waveform diagrams of another exemplary operation of the multiple output converter of FIG. 1 at selected operating conditions according to the principles of the present invention. More specifically, the primary output provides a first output current $I_{out1}$ of one amp at a first output voltage $V_{out1}$ of 12 volts and the auxiliary output provides a second output current $I_{out2}$ of one amp at a second output voltage $V_{out2}$ of 12 volts.

Figure 7A:
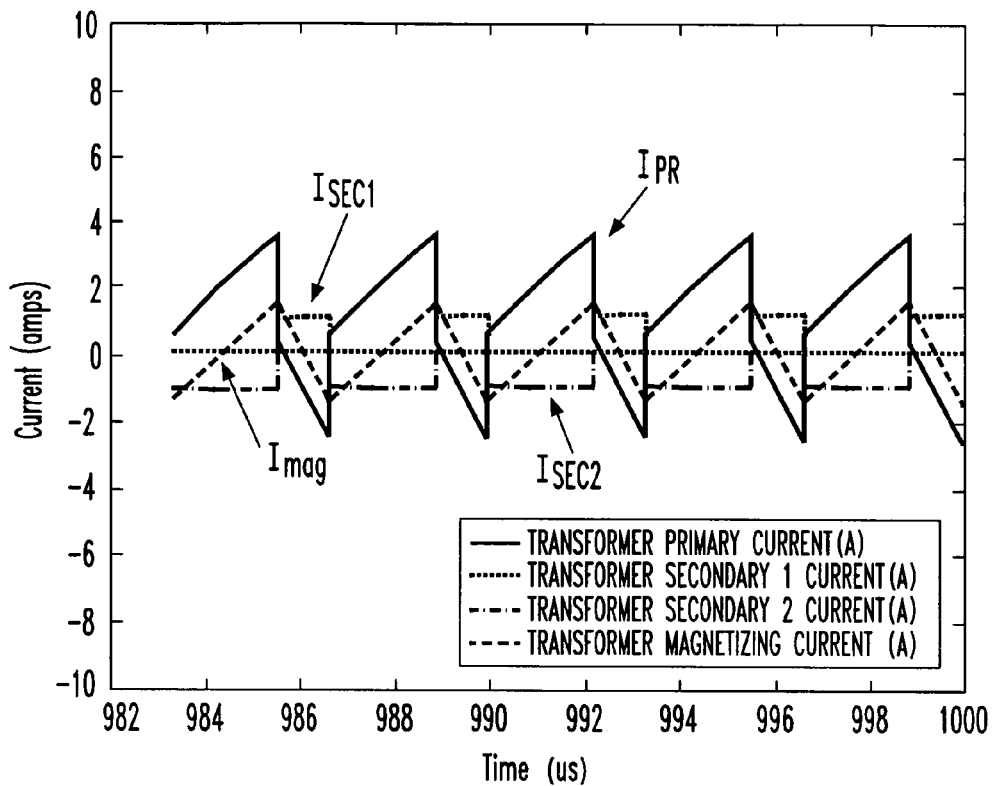
FIGS. 7A–7F illustrate waveform diagrams of another exemplary operation of the multiple output converter of FIG. 1 at selected operating conditions according to the principles of the present invention.
Figure 7B:
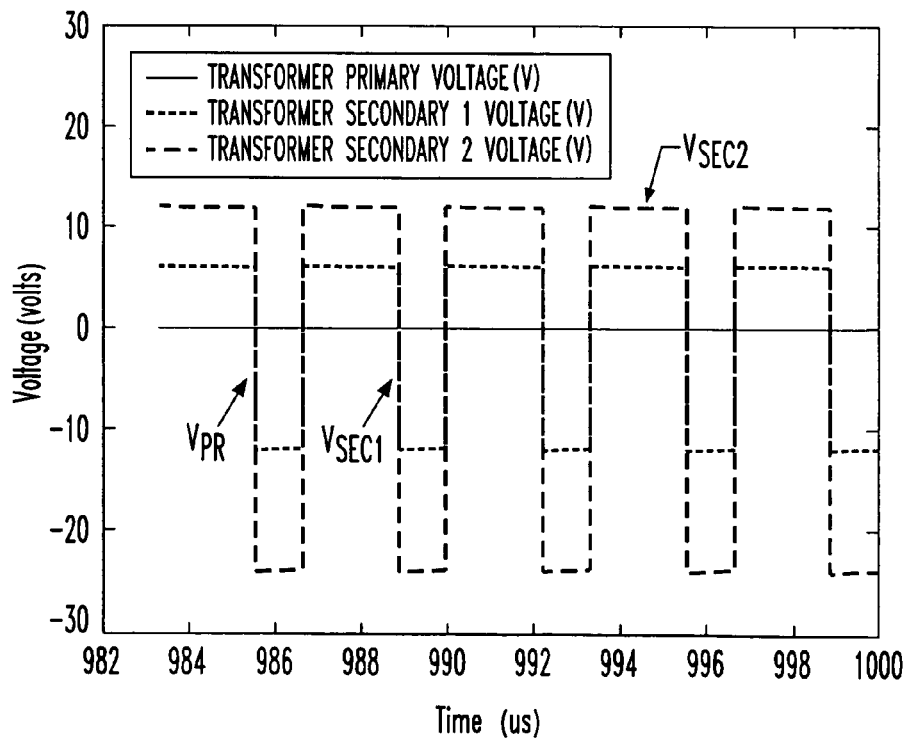
Figure 7C:
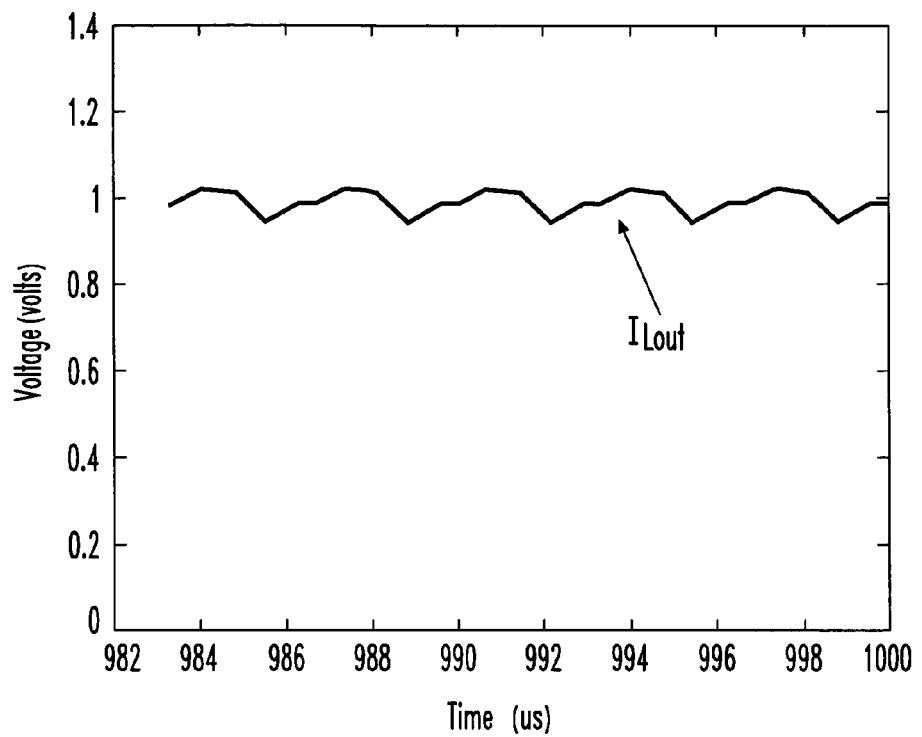
Figure 7D:
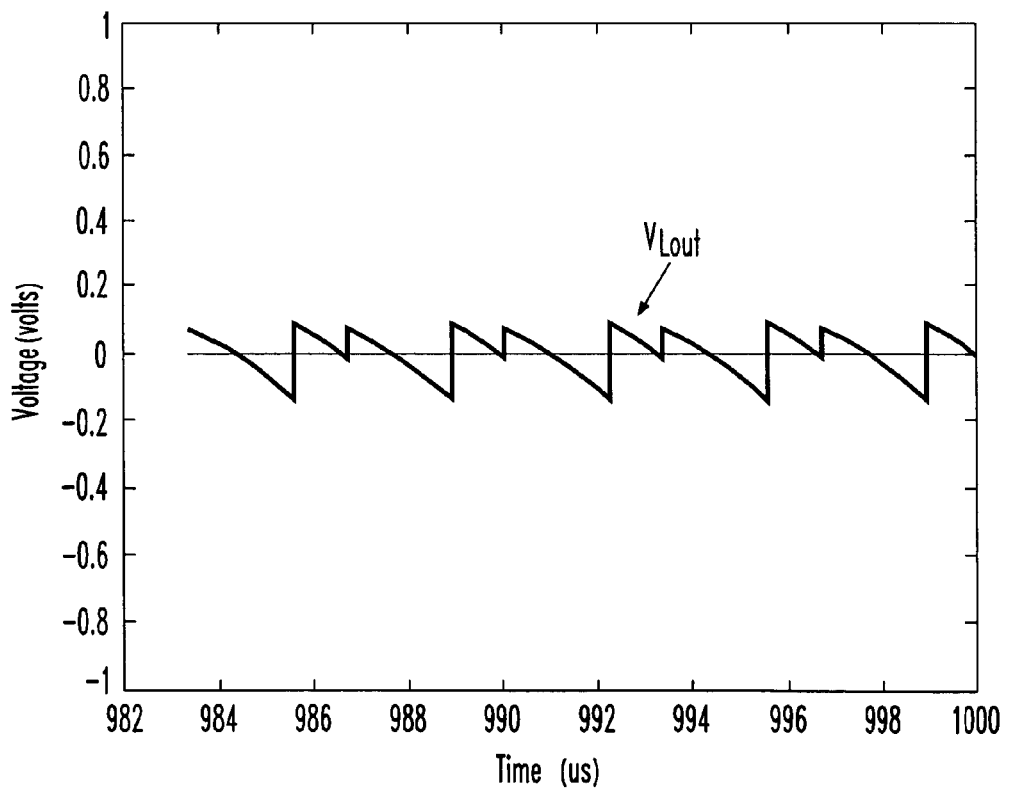
Figure 7E:
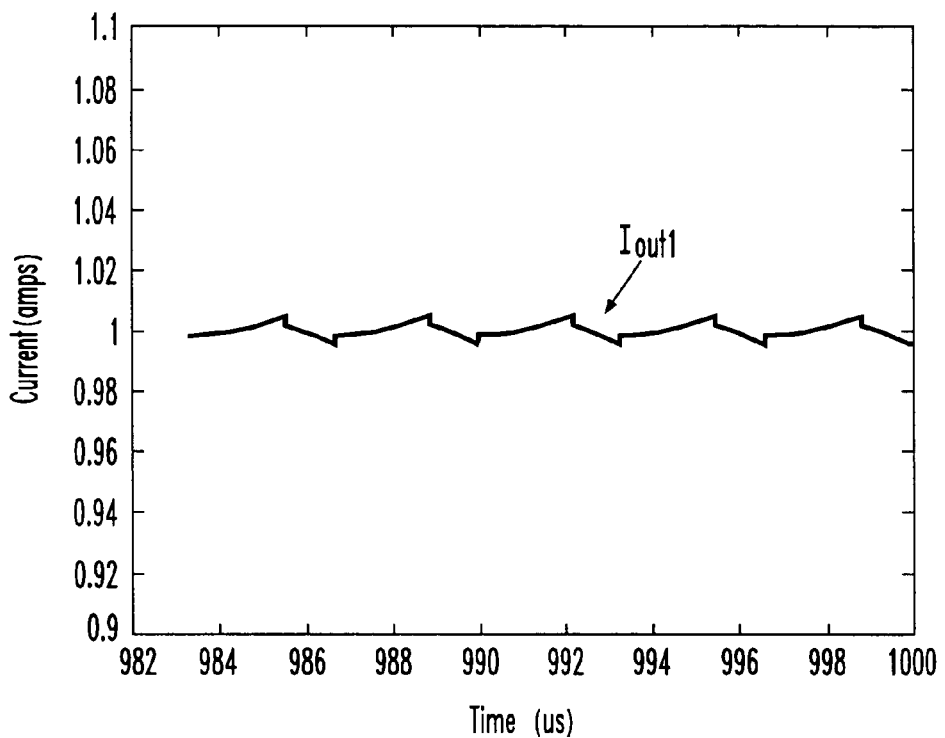
Figure 7F:
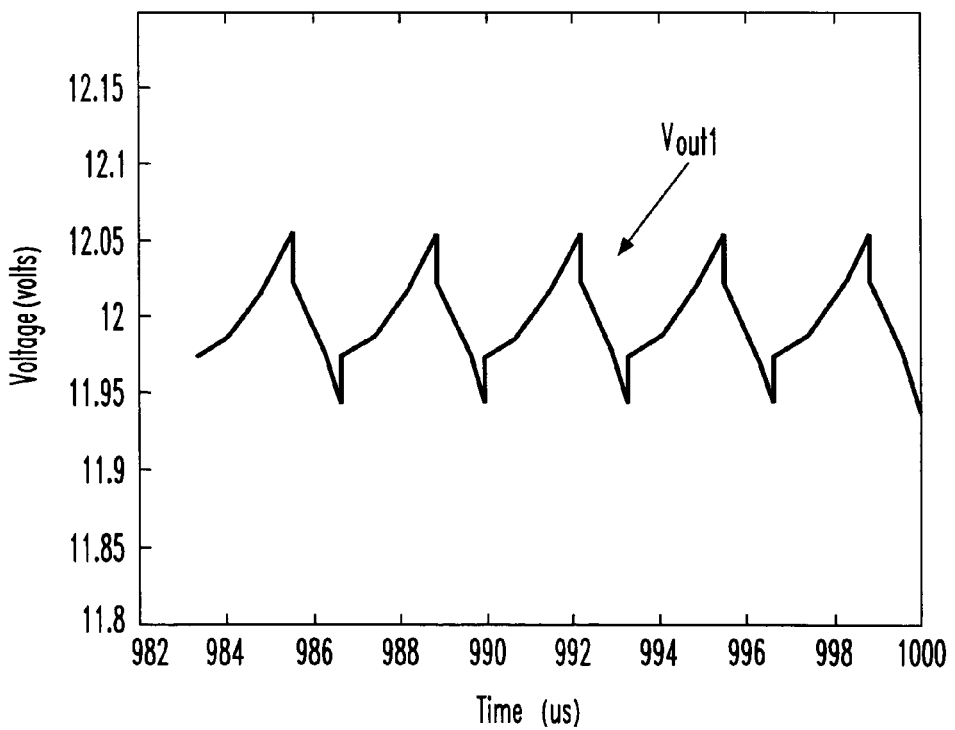

As illustrated by FIG. 7A, a DC component $I_{magDC}$ of the magnetizing current $I_{mag}$ associated with the transformer $T_1$ is zero amps (which is less than an unbiased DC component $I_{magDC}$ of the magnetizing current $I_{mag}$ of a positive one amp) thereby providing a substantially zero net DC bias across the transformer $T_1$. Furthermore, as illustrated by FIGS. 7C and 7D, the output inductor $L_{out}$ demonstrates a small inductor ripple current $I_{Lout}$ and small inductor ripple voltage $V_{Lout}$. Additionally, as illustrated by FIGS. 7E and 7F, the first output current $I_{out1}$ and first output voltage $V_{out1}$ at the primary output also exhibit a small ripple condition.

Figure 8:
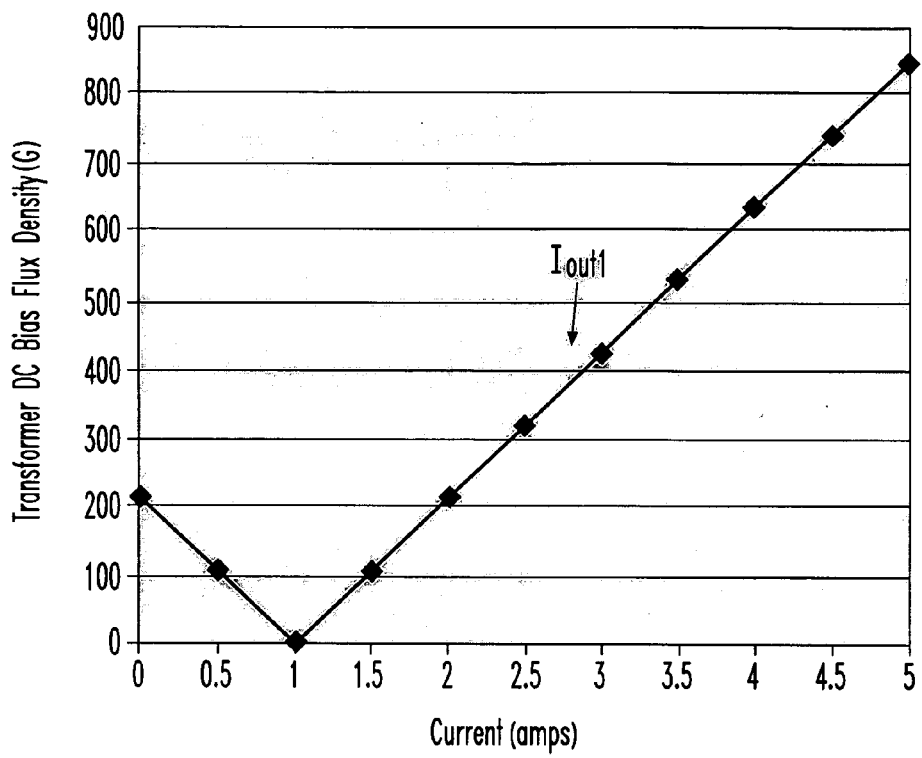
FIG. 8 illustrates a diagram demonstrating a series of exemplary operations of the multiple output converter of FIG. 1 at selected operating conditions according to the principles of the present invention.

Turning now to FIG. 8, illustrated is a diagram demonstrating a series of exemplary operations of the multiple output converter of FIG. 1 at selected operating conditions according to the principles of the present invention. More specifically, the diagram of FIG. 8 illustrates a net DC bias flux density of the transformer $T_1$ as a function of a first output current $I_{out1}$ associated with the primary output when the auxiliary output provides a second output current $I_{out2}$ of one amp at a second output voltage $V_{out2}$ of 12 volts. As illustrated, a net DC bias flux density of the transformer $T_1$ is substantially zero when the first output current $I_{out1}$ is one amp. At that operating condition, a substantially zero net DC bias flux associated with a substantially zero net DC bias current $I_{magDC}$ is demonstrated across the transformer $T_1$.

Figure 9:
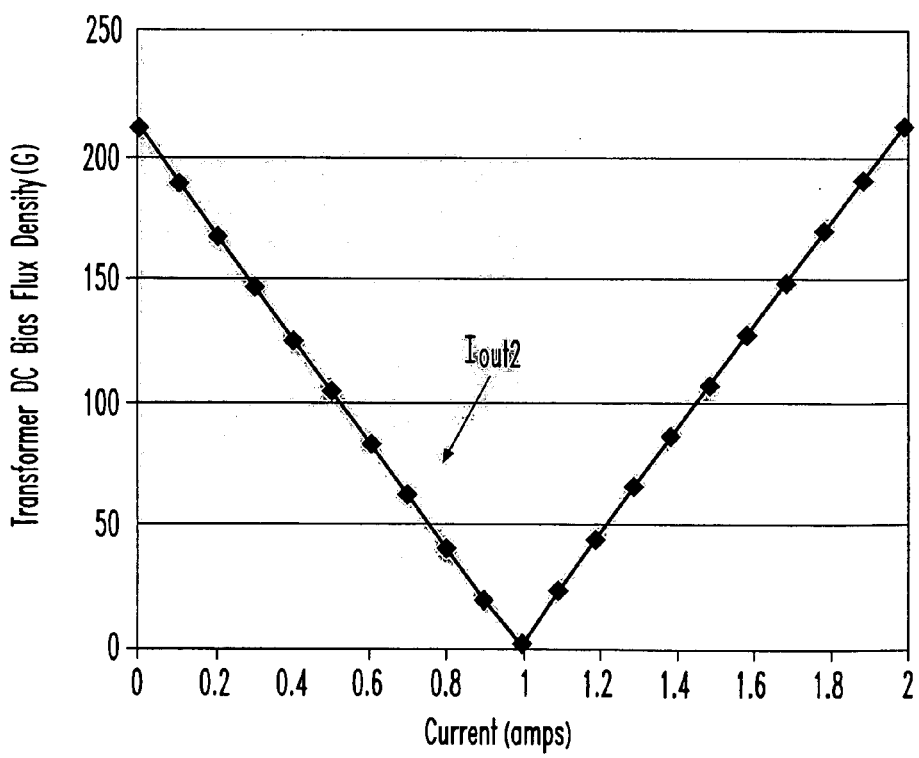
FIG. 9 illustrates a diagram demonstrating a series of exemplary operations of the multiple output converter of FIG. 1 at selected operating conditions according to the principles of the present invention.

Turning now to FIG. 9, illustrated is a diagram demonstrating a series of exemplary operations of the multiple output converter of FIG. 1 at selected operating conditions according to the principles of the present invention. More specifically, the diagram of FIG. 9 illustrates a net DC bias flux density of the transformer $T_1$ as a function of a second output current $I_{out2}$ associated with the auxiliary output when the primary output provides a first output current $I_{out1}$ of one amp at a first output voltage $V_{out1}$ of 12 volts. As illustrated, a net DC bias flux density of the transformer $T_1$ is substantially zero when the second output current $I_{out2}$ is one amp. At that operating condition, a substantially zero net DC bias flux associated with a substantially zero net DC bias current $I_{magDC}$ is demonstrated across the transformer $T_1$.

Figure 10:
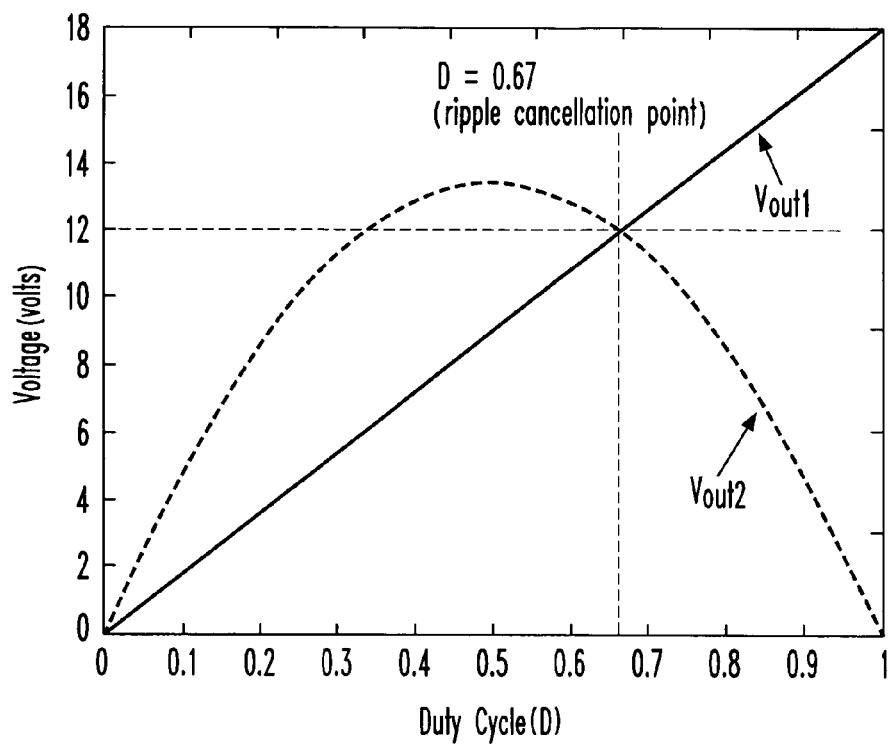
FIG. 10 illustrates a diagram demonstrating a relationship between a primary duty cycle and output voltages of the multiple output converter according to the principles of the present invention.

Turning now to FIG. 10, illustrated is a diagram demonstrating a relationship between a primary duty cycle and output voltages of the multiple output converter according to the principles of the present invention. More specifically, the diagram of FIG. 10 illustrates output voltages associated with the primary and auxiliary outputs as a function of a primary duty cycle (D) of the first switch $Q_1$ of the multiple output converter employing the values submitted in Table I above. As illustrated, a primary duty cycle D of 0.67 for the first switch $Q_1$ provides substantial ripple cancellation when the first and second output voltages $V_{out1}$, $V_{out2}$ are 12 volts, the input voltage $V_{in}$ is 18 volts, and the number of turns $N_P$, $N_{S1}$, $N_{S2}$ for the primary winding PR, first secondary winding $SEC_1$ and second secondary winding $SEC_2$ of transformer $T_1$ are 3, 3, 6, respectively.

Figure 11:
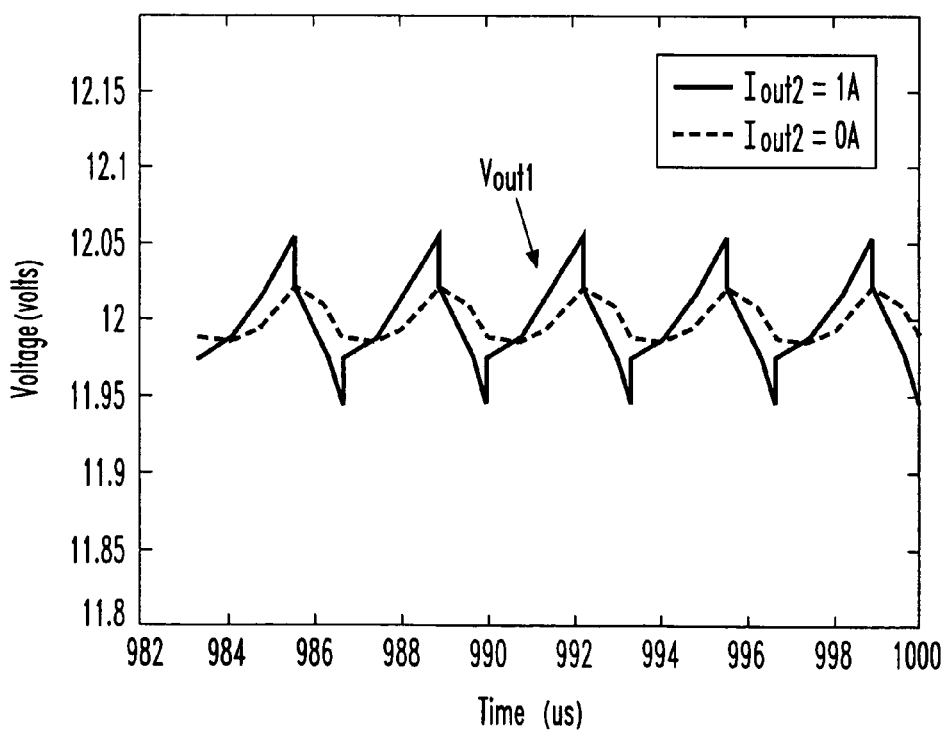
FIG. 11 illustrates a waveform diagram of another exemplary operation of the multiple output converter of FIG. 1 at selected operating conditions according to the principles of the present invention.

Turning now to FIG. 11, illustrated is a waveform diagram of another exemplary operation of the multiple output converter of FIG. 1 at selected operating conditions according to the principles of the present invention. More specifically, the waveform diagram of FIG. 11 illustrates a first output voltage $V_{out1}$ associated with the primary output as a function of time with the second output current $I_{out2}$ of the auxiliary output providing one amp and zero amps, respectively. As illustrated, a change in the second output current $I_{out2}$ affects a ripple condition associated with the first output voltage $V_{out1}$.

Figure 12:
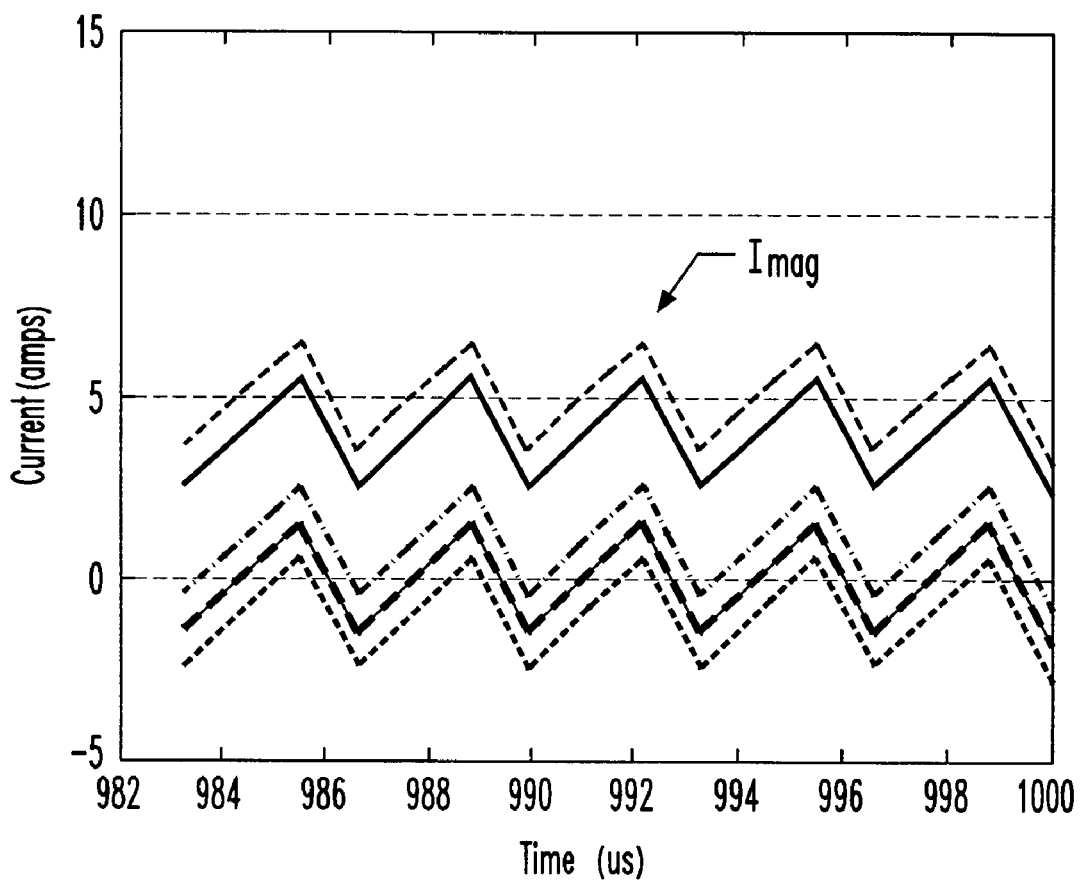
FIG. 12 illustrates a waveform diagram of another series of exemplary operations of the multiple output converter of FIG. 1 at selected operating conditions according to the principles of the present invention.
Figure 12:
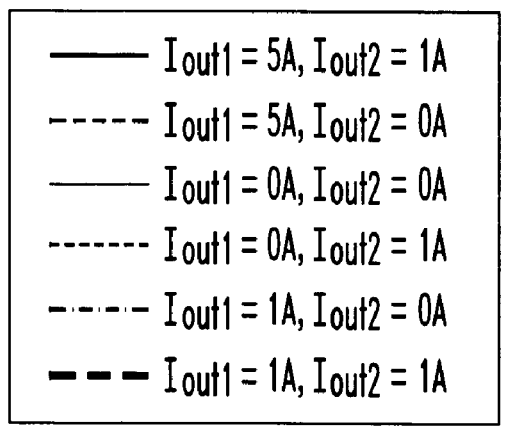

Turning now to FIG. 12, illustrated is a waveform diagram of another series of exemplary operations of the multiple output converter of FIG. 1 at selected operating conditions according to the principles of the present invention. More specifically, the waveform diagram of FIG. 12 illustrates a magnetizing current $I_{mag}$ of the transformer $T_1$ as a function of time over several operating conditions of the multiple output converter. As illustrated, different operating conditions, namely, a change in the first and second output currents $I_{out1}$, $I_{out2}$ affect the magnetizing current $I_{mag}$ of the transformer $T_1$. In accordance therewith, the different operating conditions affect a DC component $I_{magDC}$ of the magnetizing current $I_{mag}$ associated with the transformer $T_1$.

Thus, a multiple output converter, and related method of operation thereof, with readily attainable and quantifiable advantages has been introduced. Those skilled in the art should understand that the previously described embodiments of the multiple output converter and exemplary operating conditions are submitted for illustrative purposes only and that other converter embodiments capable of providing multiple outputs while addressing a ripple condition in the converter and a net DC bias associated with a transformer are well within the broad scope of the present invention.

Exemplary embodiments of the present invention have been illustrated above with reference to specific electronic and magnetic components. Those skilled in the art are aware, however, that components may be substituted (not necessarily with components of the same type) to create desired conditions or accomplish desired results. For instance, multiple components may be substituted for a single component and vice-versa. Additionally, the multiple output converter illustrated and described herein includes two outputs, namely, the primary output and the auxiliary output. It should be understood by those skilled in the art, however, that the multiple output converter may have more than two outputs (e.g., a primary output and multiple auxiliary outputs) and still fall within the broad scope of the present invention. In such a case, a magnetizing current may be derived from a primary winding and multiple secondary windings associated with the transformer.

For a better understanding of power electronics control systems, see Erickson, R. W., *Fundamentals of Power Electronics*, Chapman and Hall (1997). For a better understanding of power electronics and power converter topologies, see Kassakian, et al., *Principles of Power Electronics*, Addison-Wesley Publishing Company (1991). The aforementioned references are incorporated herein by reference in their entirety.

Although the present invention has been described in detail, those skilled in the art should understand that they can make various changes, substitutions and alterations herein without departing from the spirit and scope of the invention in its broadest form.

What is claimed is:

1. A buck converter with multiple outputs including a primary output and at least one auxiliary output, comprising:
    a transformer having a primary winding and at least one secondary winding;
    a switch, coupled to said primary winding, configured to impress an input voltage across said transformer, a first DC output voltage configured to be provided at said primary output employing a magnetizing inductance associated with said transformer as an inductor; and
    an output inductor coupled to said at least one secondary winding, a second DC output voltage configured to be provided at said auxiliary output via said output inductor.

2. The multiple output converter as recited in claim 1 further comprising a rectifier coupled to said at least one secondary winding.

3. The multiple output converter as recited in claim 1 wherein said transformer comprises first and second secondary windings.

4. The multiple output converter as recited in claim 3 further comprising a synchronous rectifier having first and second synchronous rectifier switches coupled to one of said first and second secondary windings.

5. The multiple output converter as recited in claim 4 wherein said first and second synchronous rectifier switches are cross-coupled.

6. The multiple output converter as recited in claim 1 further comprising another switch coupled to said primary winding.

7. The multiple output converter as recited in claim 6 wherein said switch is configured to conduct for a primary duty cycle (D) and said another switch is configured to conduct for a complementary duty cycle (1-D).

8. The multiple output converter as recited in claim 7 wherein said primary duty cycle (D) of said switch is selected to provide at least one of substantial ripple cancellation associated with said multiple output converter and a substantially zero net DC bias across said transformer.

9. The multiple output converter as recited in claim 1 further comprising an output capacitor coupled to said primary winding.

10. The multiple output converter as recited in claim 1 further comprising an output capacitor coupled to said output inductor.

11. A method of operating a buck converter with multiple outputs including a primary output and at least one auxiliary output, comprising:
    providing a transformer having a primary winding and at least one secondary winding;
    impressing an input voltage across said transformer with a switch coupled to said primary winding;
    producing a first DC output voltage at said primary output employing a magnetizing inductance associated with said transformer as an inductor; and
    further producing a second DC output voltage at said auxiliary output via an output inductor coupled to said at least one secondary winding.

12. The method as recited in claim 11 further comprising providing a rectifier coupled to said at least one secondary winding.

13. The method as recited in claim 11 wherein said transformer comprises first and second secondary windings.

14. The method as recited in claim 13 further comprising providing a synchronous rectifier having first and second synchronous rectifier switches coupled to one of said first and second secondary windings.

15. The method as recited in claim 14 further comprising cross-coupling said first and second synchronous rectifier switches.

16. The method as recited in claim 11 wherein said impressing is performed in cooperation with another switch coupled to said primary winding.

17. The method as recited in claim 16 further comprising causing said switch to conduct for a primary duty cycle (D) and said another switch to conduct for a complementary duty cycle (1-D).

18. The method as recited in claim 17 wherein said primary duty cycle (D) of said switch is selected to provide at least one of substantial ripple cancellation associated with said multiple output converter and a substantially zero net DC bias across said transformer.

19. The method as recited in claim 11 further comprising filtering said first output voltage with an output capacitor coupled to said primary winding.

20. The method as recited in claim 11 further comprising filtering said second output voltage with an output capacitor coupled to said at least one secondary winding.

* * * * *